(12) United States Patent
Kim et al.

(10) Patent No.: US 11,535,086 B2
(45) Date of Patent: Dec. 27, 2022

(54) HEATING ROD, HEATING MODULE INCLUDING SAME, AND HEATING DEVICE INCLUDING SAME

(71) Applicant: LG INNOTEK CO., LTD., Seoul (KR)

(72) Inventors: Won Jin Kim, Seoul (KR); Dong Hwa Lee, Seoul (KR); In Jae Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 709 days.

(21) Appl. No.: 16/471,488

(22) PCT Filed: Dec. 5, 2017

(86) PCT No.: PCT/KR2017/014117
§ 371 (c)(1),
(2) Date: Jun. 19, 2019

(87) PCT Pub. No.: WO2018/117484
PCT Pub. Date: Jun. 28, 2018

(65) Prior Publication Data
US 2019/0381862 A1   Dec. 19, 2019

(30) Foreign Application Priority Data

Dec. 20, 2016  (KR) .......................... 10-2016-0174875
Jan. 4, 2017   (KR) .......................... 10-2017-0001351
Jan. 4, 2017   (KR) .......................... 10-2017-0001352

(51) Int. Cl.
*B60H 1/22*   (2006.01)
*H05B 3/06*   (2006.01)
(Continued)

(52) U.S. Cl.
CPC ............. *B60H 1/2225* (2013.01); *H05B 3/06* (2013.01); *H05B 3/12* (2013.01); *H05B 3/141* (2013.01); *H05B 3/50* (2013.01)

(58) Field of Classification Search
CPC ...... B60H 1/2225; B60H 1/22; B60H 1/2218; B60H 2001/224; B60H 2001/2246;
(Continued)

(56) References Cited

U.S. PATENT DOCUMENTS 5,560,851 A * 10/1996 Thimm ................. H05B 3/141
                                                   219/543
6,263,158 B1   7/2001 Rutherford
(Continued)

FOREIGN PATENT DOCUMENTS

KR   10-2012-0032795 A   4/2012
KR   10-1510744 B1       4/2015
WO   WO 2014/010917 A1   1/2014

*Primary Examiner* — Dana Ross
*Assistant Examiner* — Joe E Mills, Jr.
(74) *Attorney, Agent, or Firm* — Birch, Stewart, Kolasch & Birch, LLP

(57) ABSTRACT

According to one embodiment of the present invention, a heating rod comprises: a first thermal diffusion plate; a ceramic substrate arranged on the first thermal diffusion plate and having a heating element arranged therein; and a second thermal diffusion plate arranged on the ceramic substrate, wherein the first thermal diffusion plate and the second thermal diffusion plate are respectively stacked in a plurality of layers. Since the first thermal diffusion plate and the second thermal diffusion plate are stacked in the plurality of layers, a heating rod having a high thermal efficiency and being capable of fast heating and a vehicular heating device including the same can be obtained.

20 Claims, 17 Drawing Sheets

(51) Int. Cl.
*H05B 3/12* (2006.01)
*H05B 3/14* (2006.01)
*H05B 3/50* (2006.01)

(58) Field of Classification Search
CPC .. B60H 2001/2271; H05B 3/12; H05B 3/141; H05B 3/50; H05B 3/14; H05B 3/265; H05B 3/46; H05B 2203/023; H05B 2203/06; H05B 2203/01; H05B 2203/02; H05B 2214/04; F24H 2250/04; F24H 3/0429; F24H 3/0435; F24H 9/1872
See application file for complete search history.

(56) References Cited

U.S. PATENT DOCUMENTS

| | | | |
|---|---|---|---|
| 2008/0296008 A1* | 12/2008 | Kim | F28D 1/0478 |
| | | | 165/182 |
| 2013/0287378 A1* | 10/2013 | Kida | H05B 3/42 |
| | | | 392/465 |
| 2014/0008450 A1 | 1/2014 | Gu et al. | |
| 2014/0124499 A1* | 5/2014 | Wei | H05B 3/24 |
| | | | 219/541 |
| 2014/0124500 A1 | 5/2014 | Wei et al. | |
| 2017/0309499 A1* | 10/2017 | Oi | H05K 3/20 |

\* cited by examiner

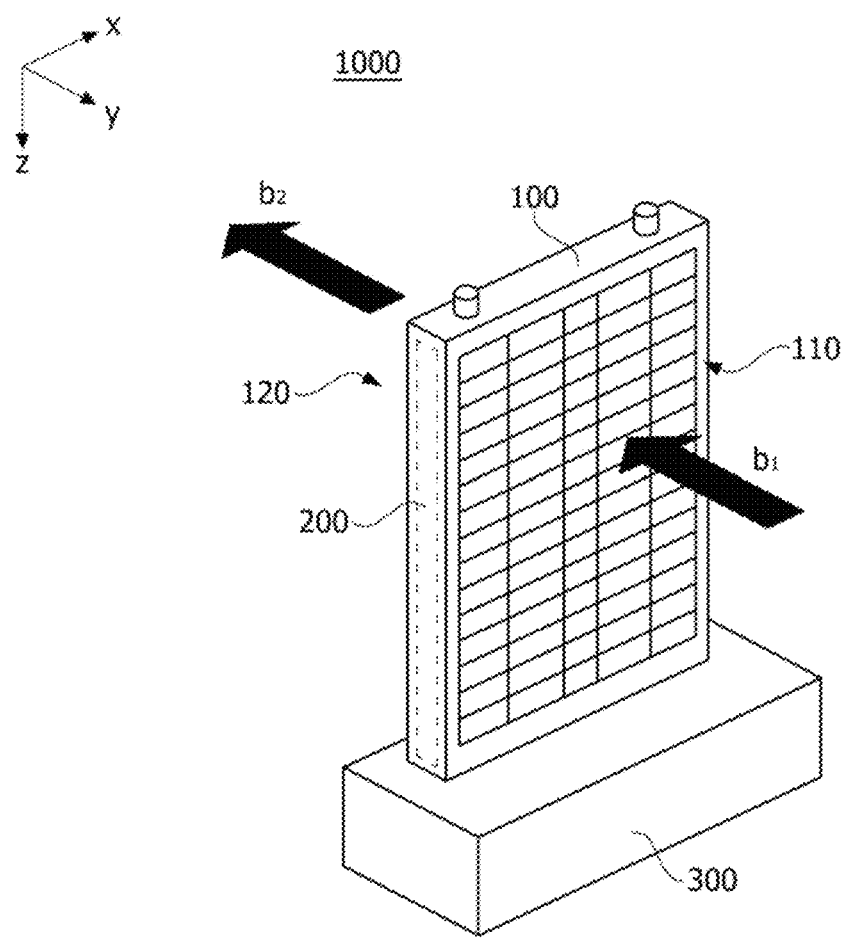
[Fig.1]

[Fig.2]
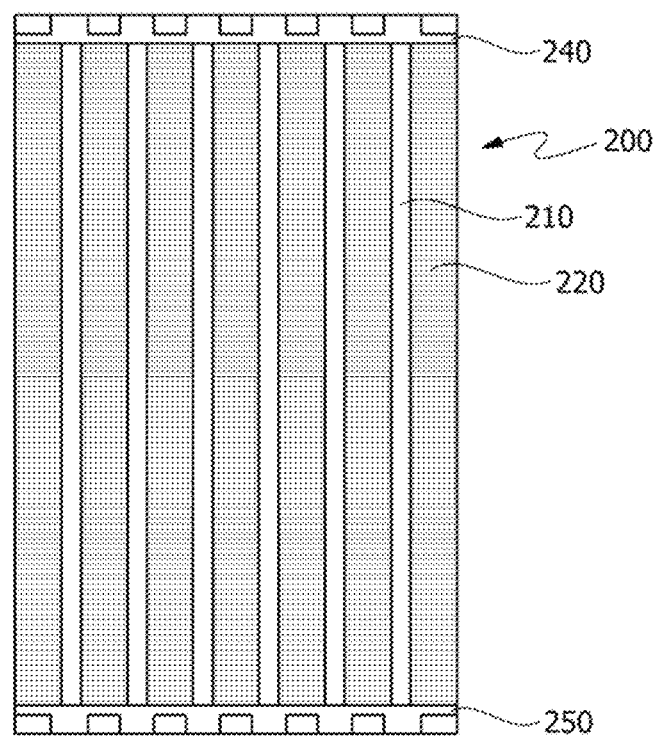
[Fig.3]
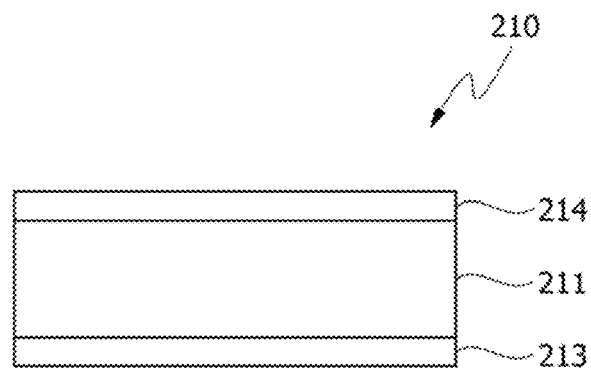

[Fig.4]
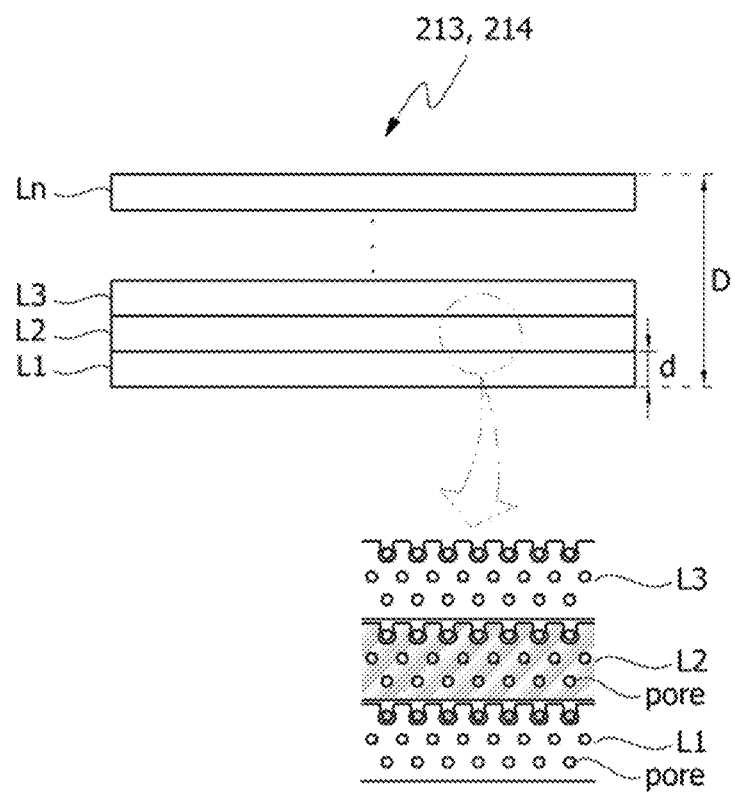
[Fig.5]
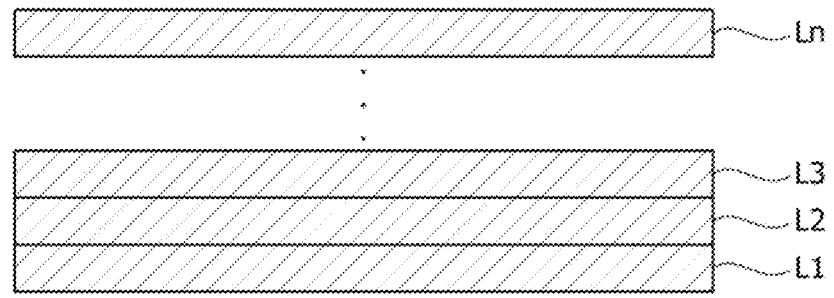

[Fig.6]
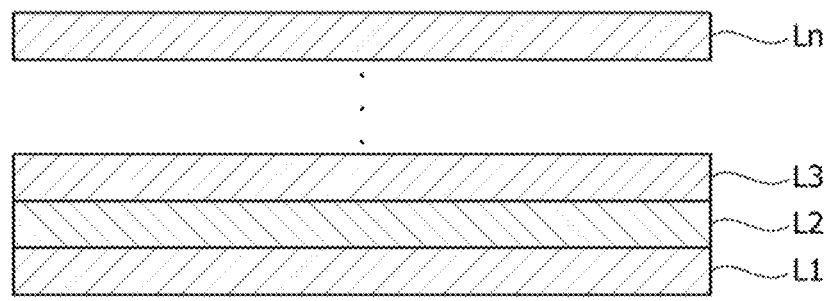
[Fig.7]
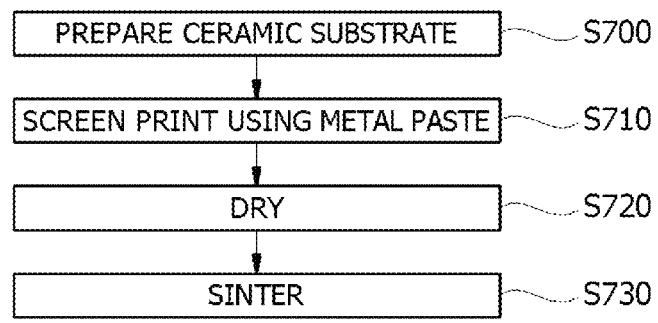

[Fig.8]
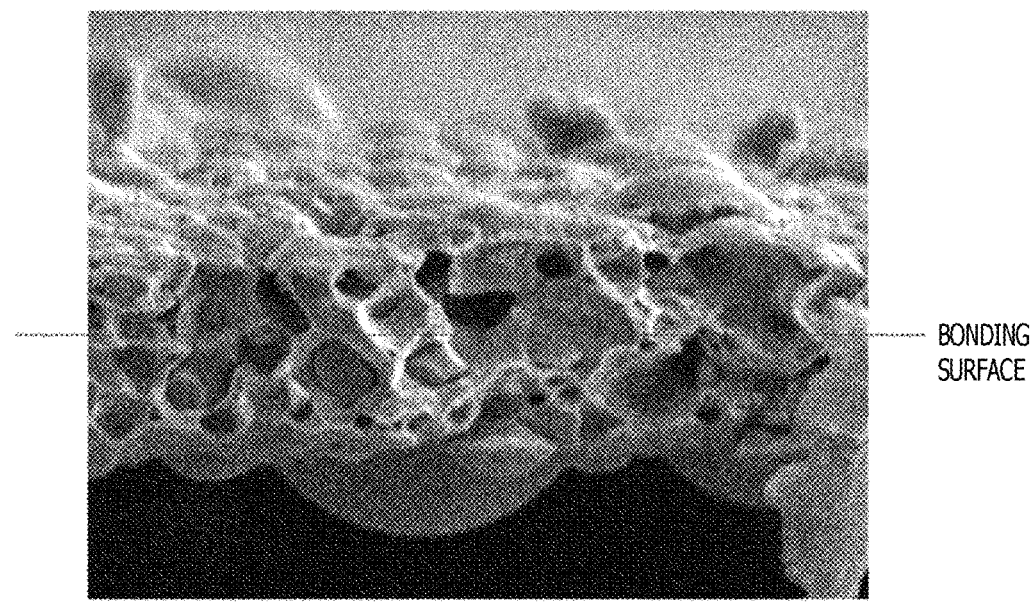
[Fig.9]
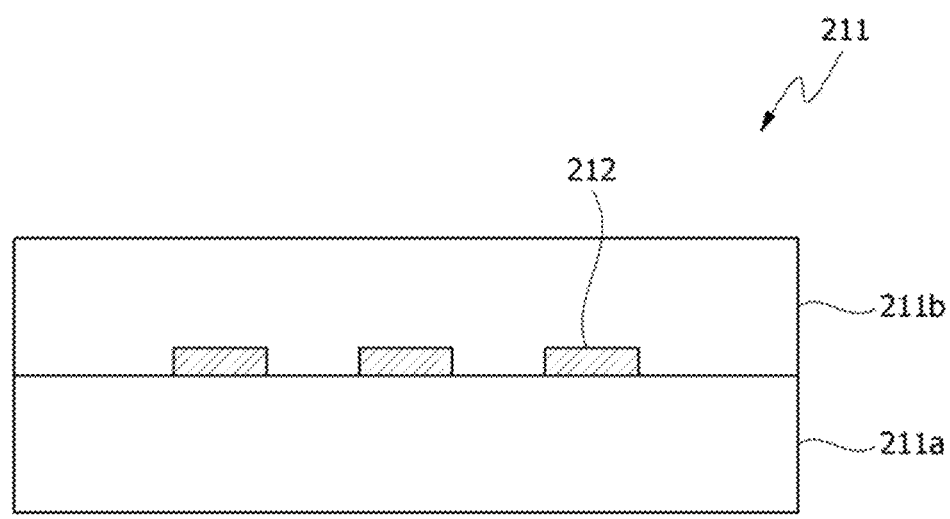

[Fig.10]
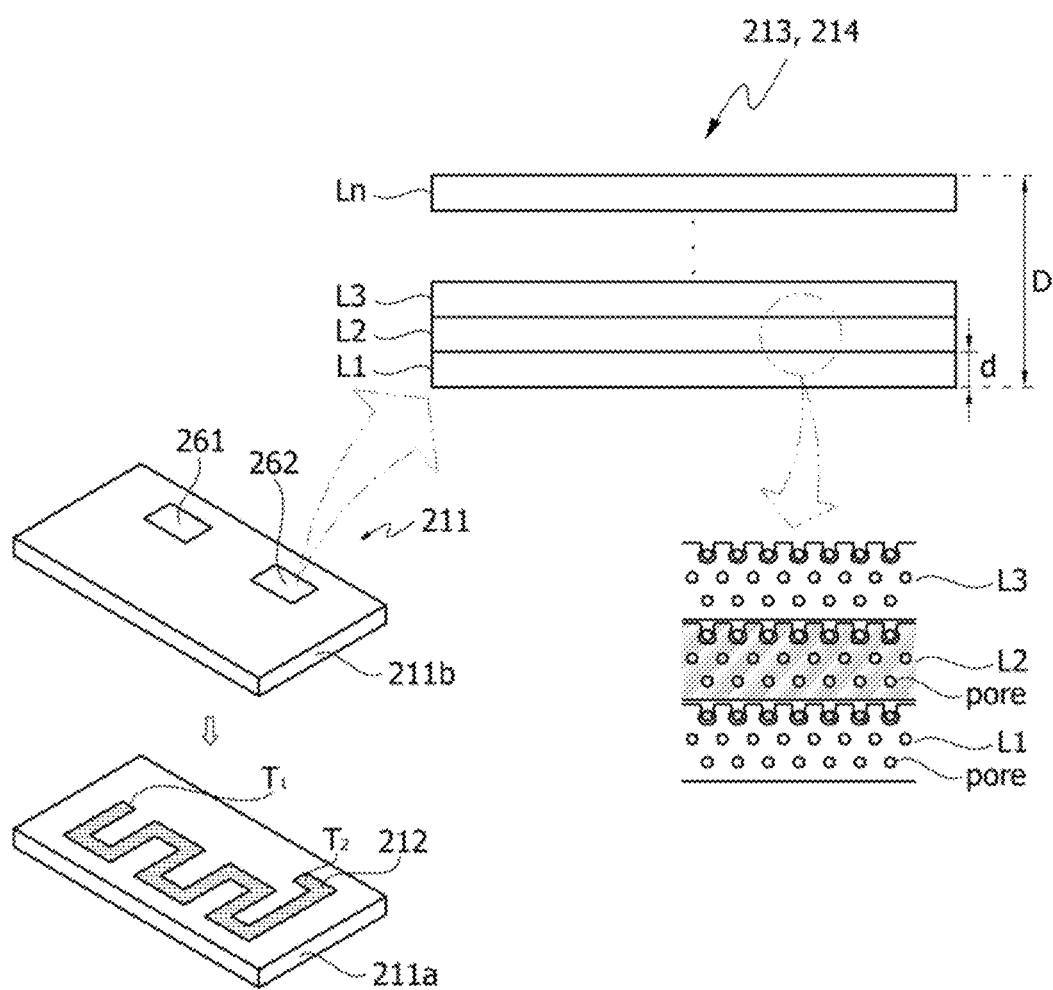

[Fig.11]
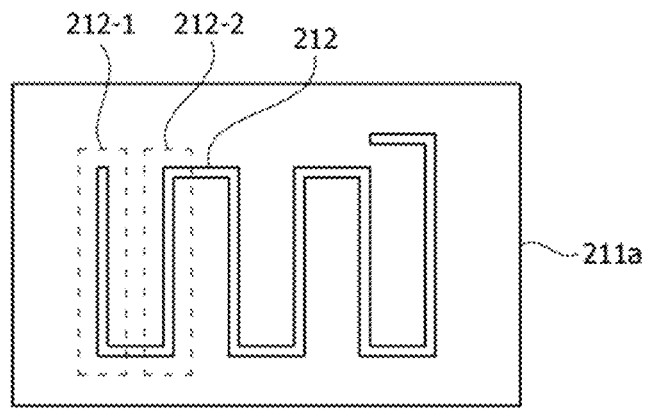
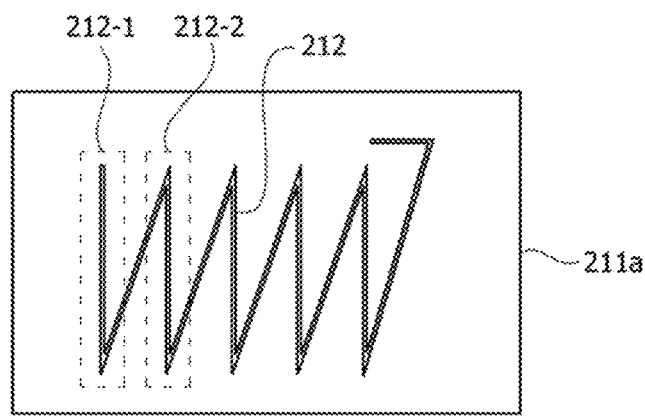
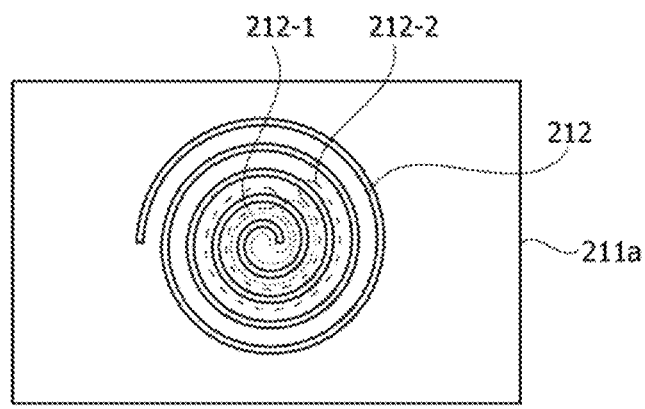

[Fig.12]
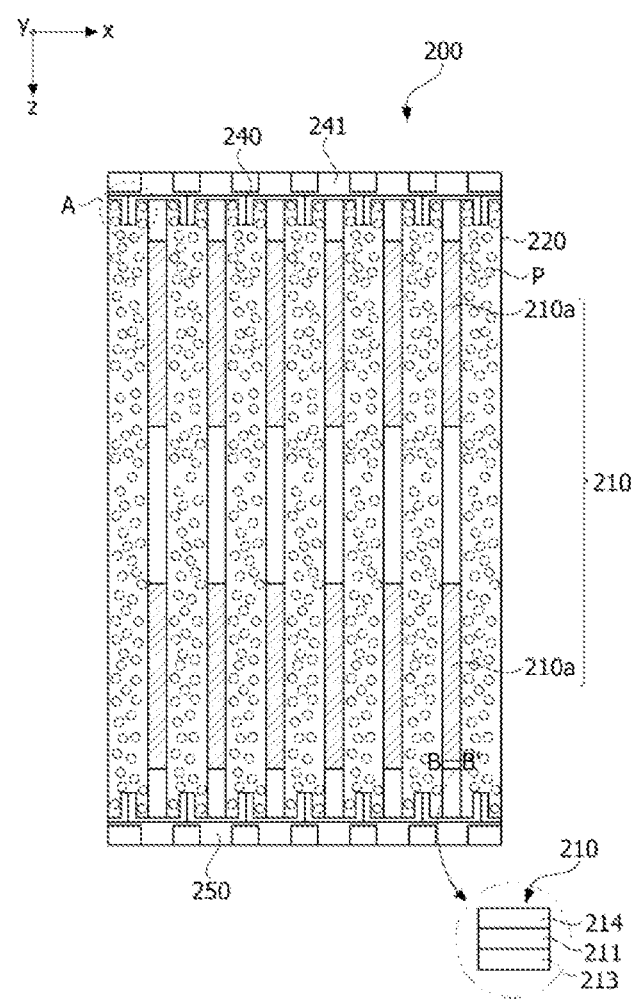

[Fig.13]
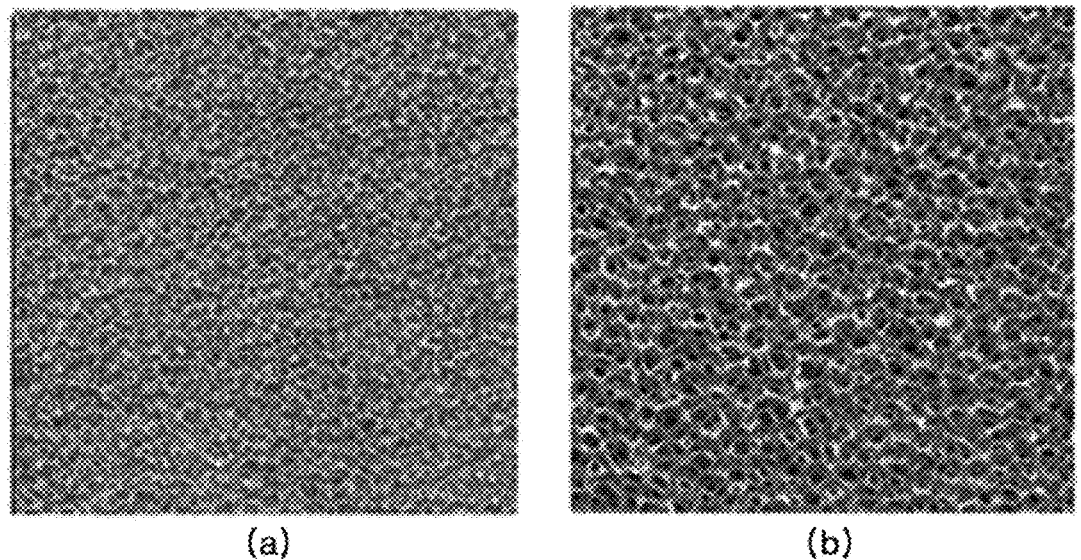
(a)　　　　　　　　　　　(b)
[Fig.14]
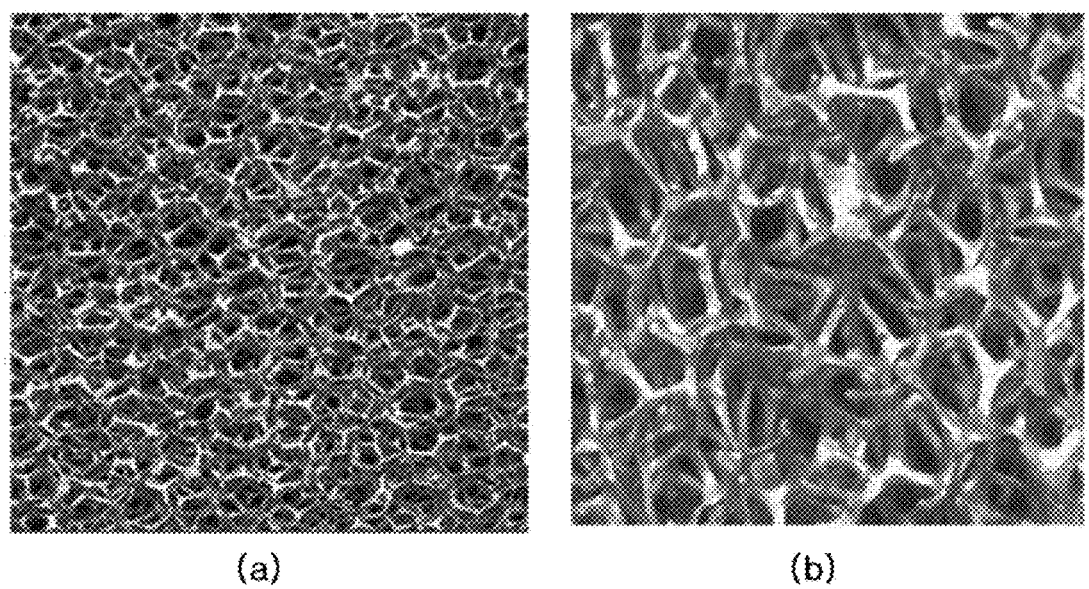
(a)　　　　　　　　　　　(b)

【Fig.15】
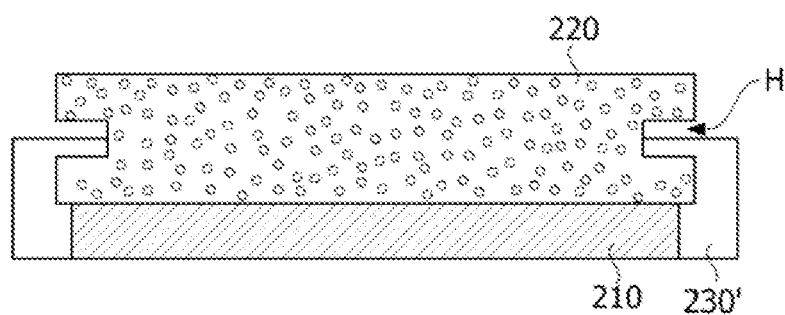

[Fig.16]
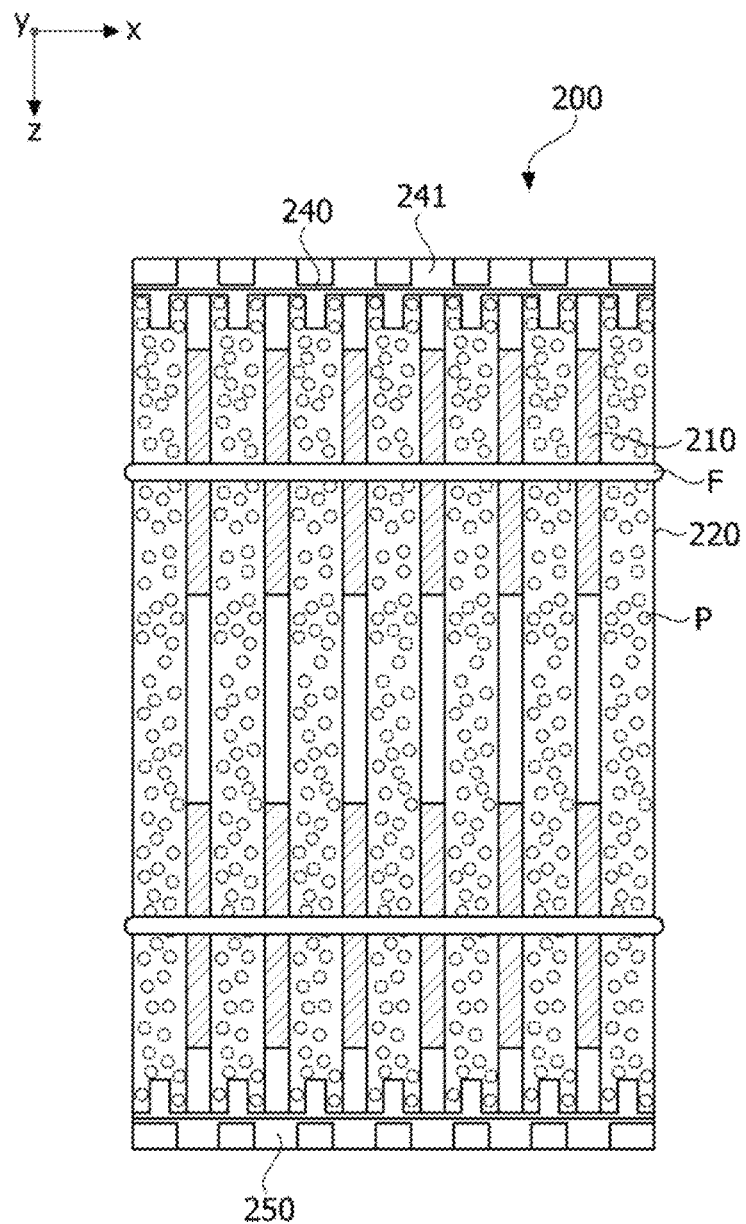

[Fig.17]
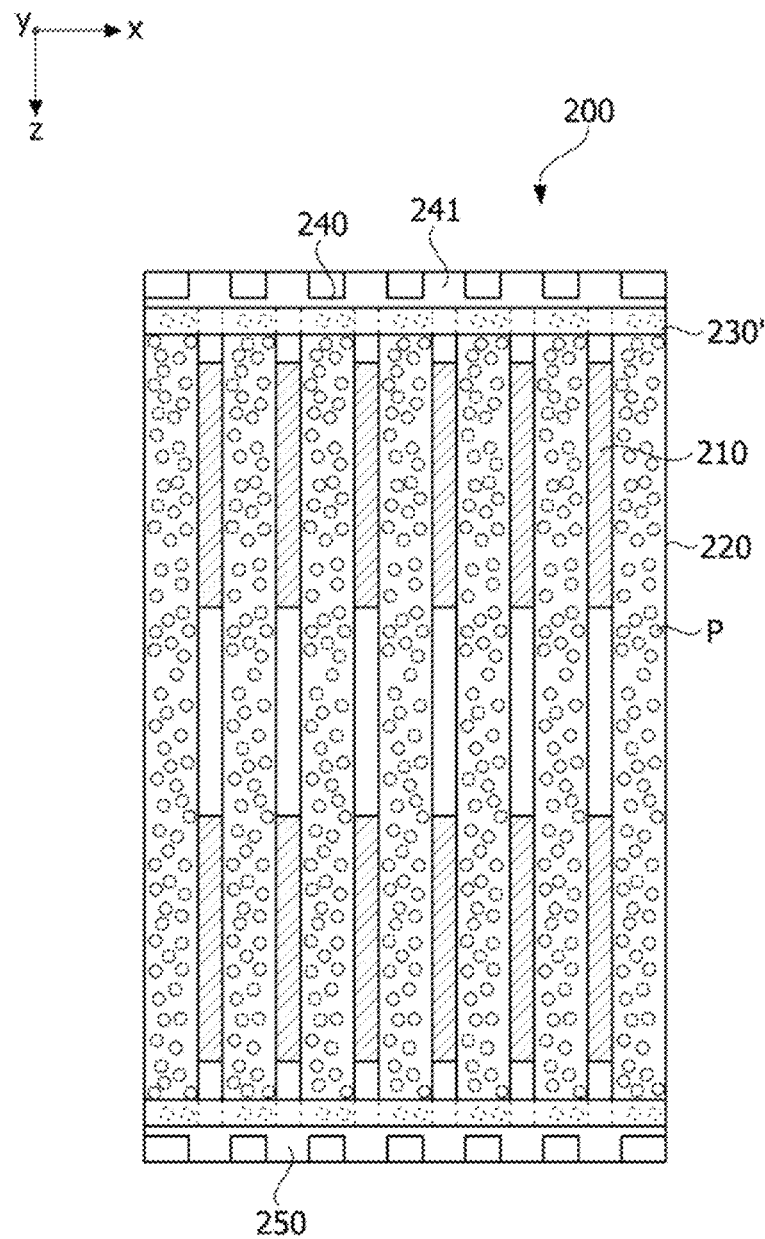

[Fig.18]
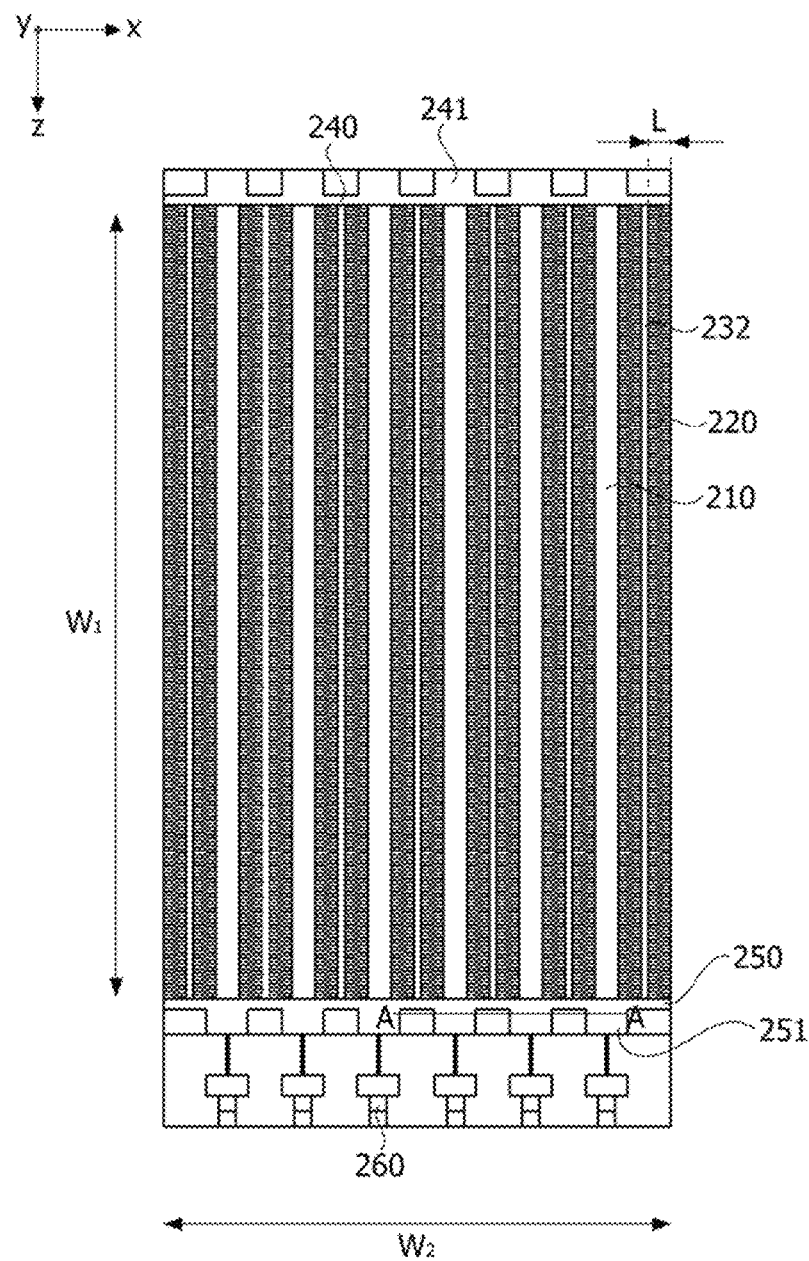

[Fig.19]
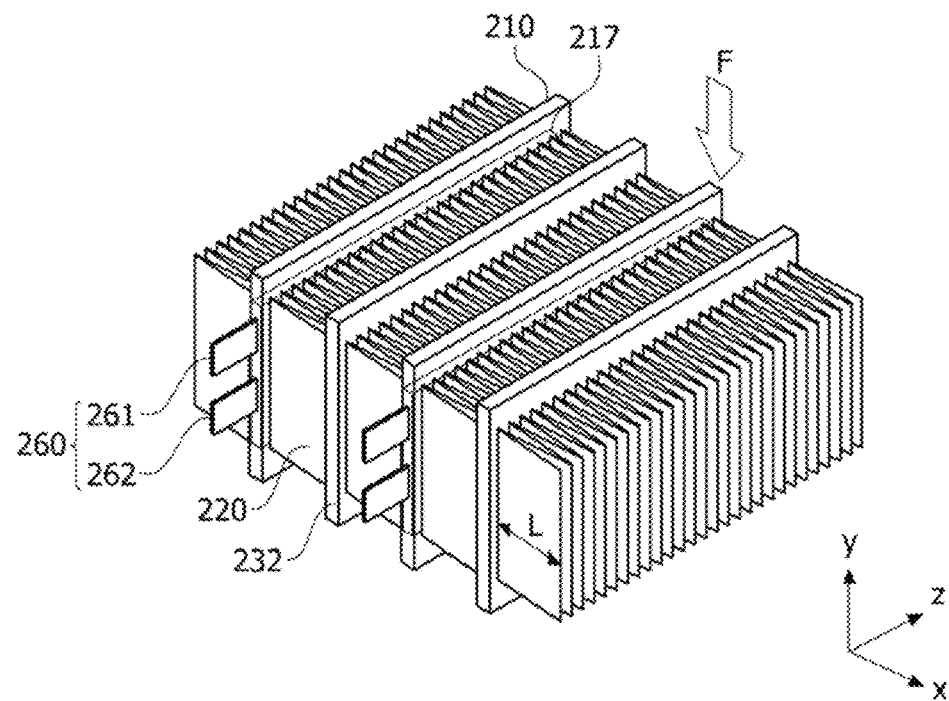
[Fig.20]
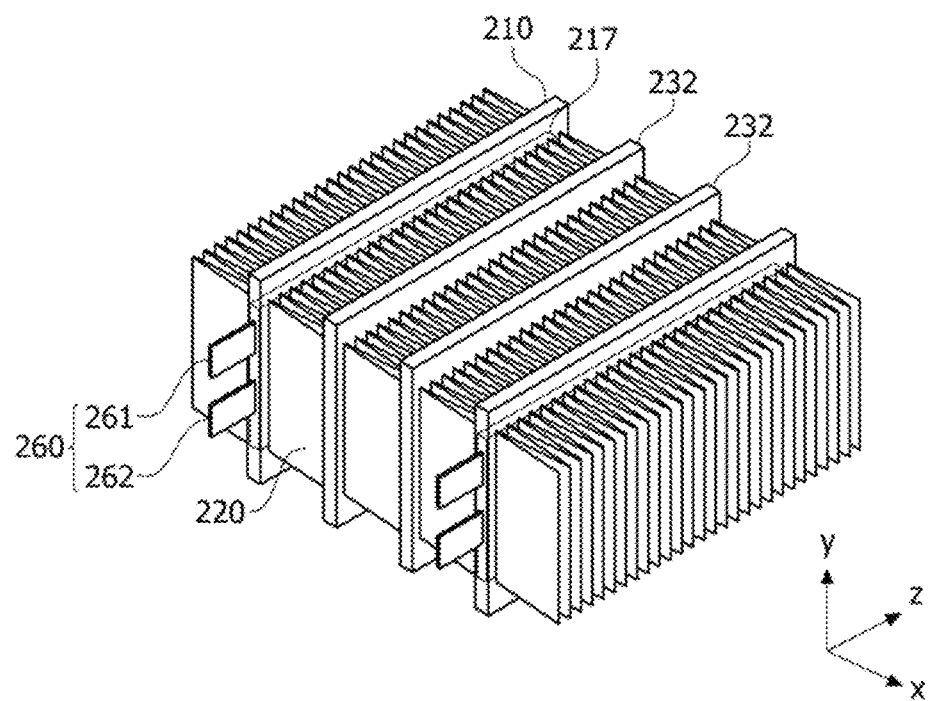

[Fig.21]
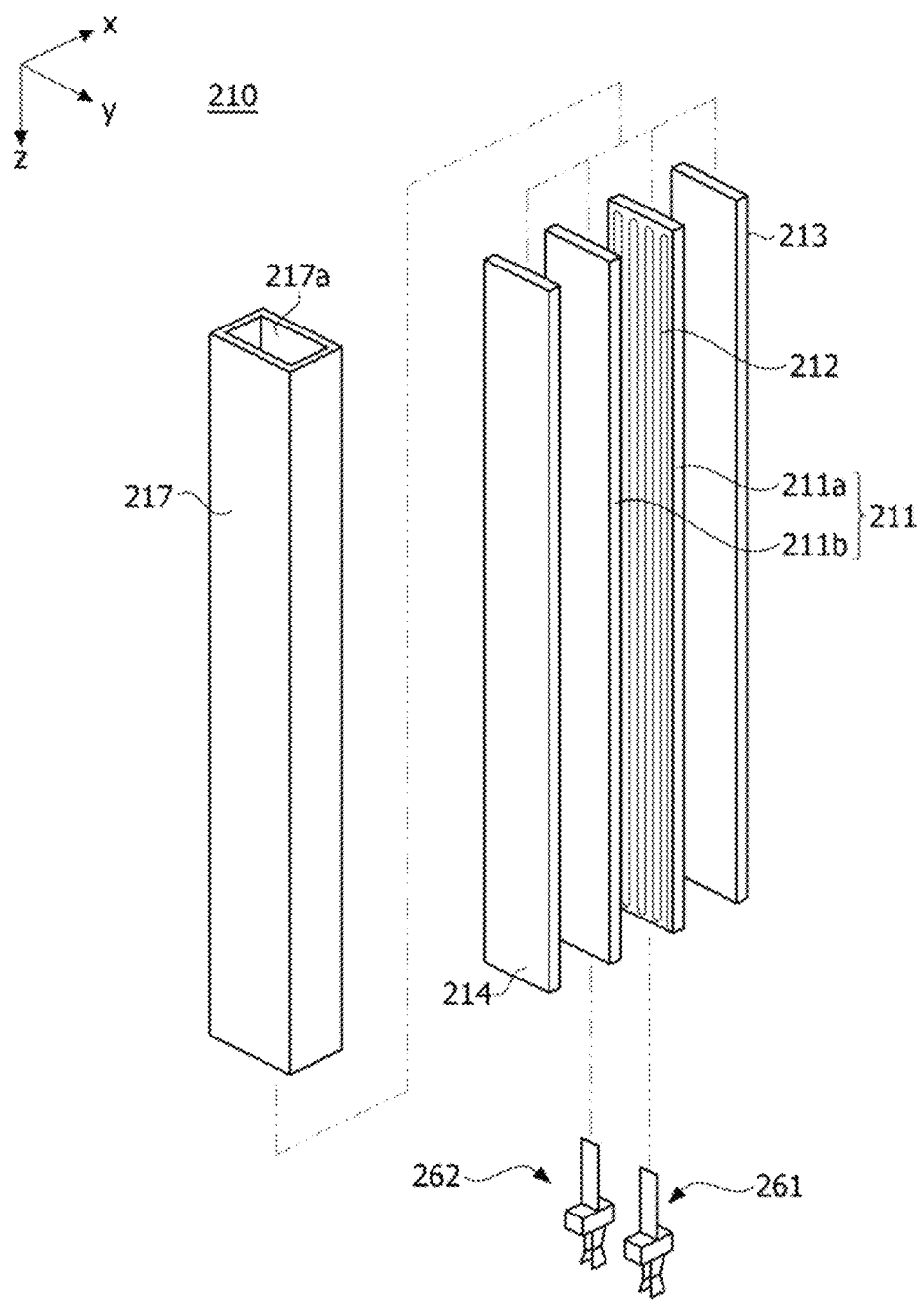

【Fig.22】
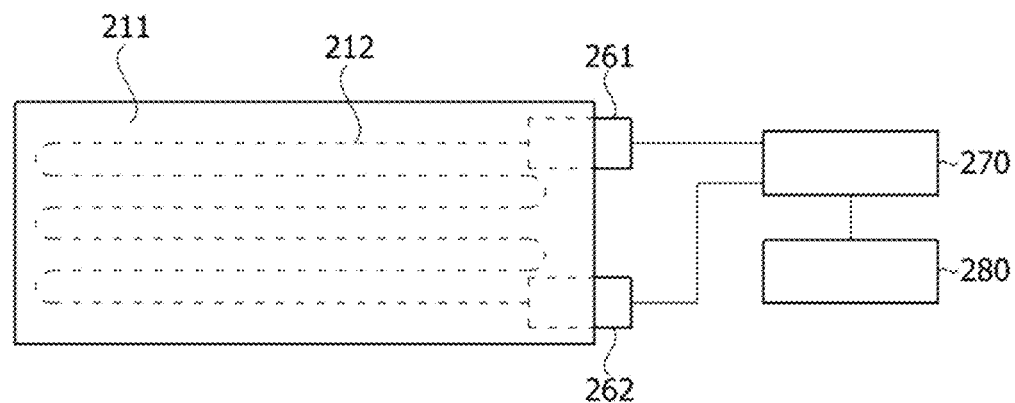
【Fig.23】
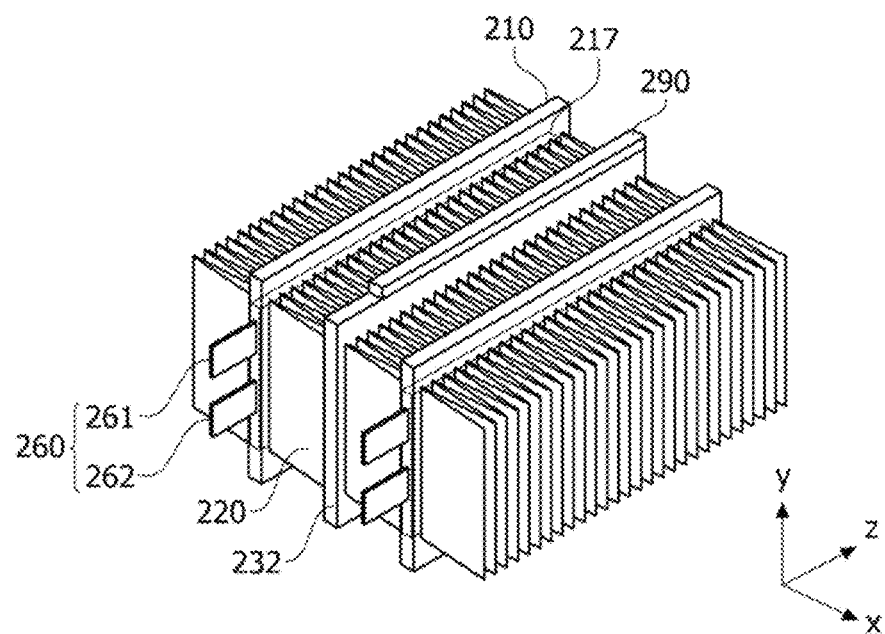

[Fig.24]
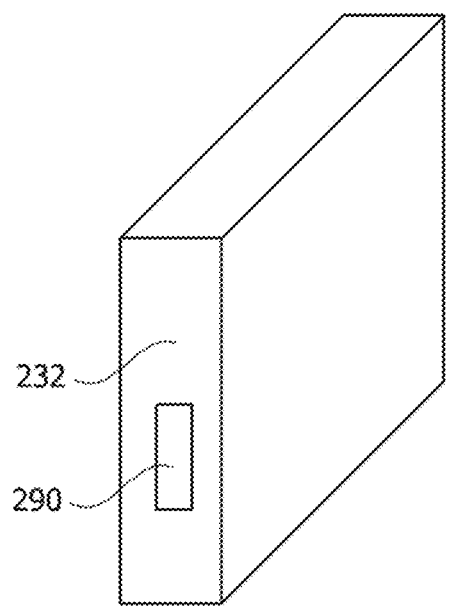
[Fig.25]
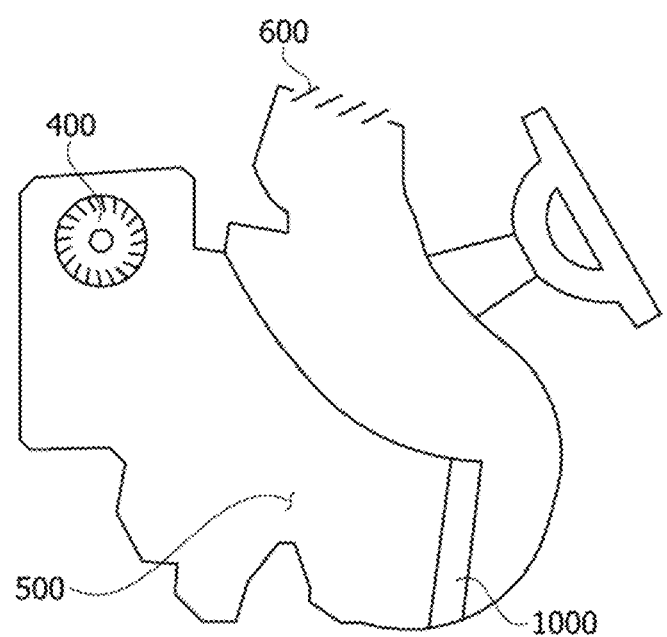

HEATING ROD, HEATING MODULE INCLUDING SAME, AND HEATING DEVICE INCLUDING SAME

CROSS REFERENCE TO RELATED APPLICATIONS

This application is the National Phase of PCT International Application No. PCT/KR2017/014117, filed on Dec. 5, 2017, which claims priority under 35 U.S.C. 119(a) to Patent Application No. 10-2016-0174875, filed in the Republic of Korea on Dec. 20, 2016, Patent Application No. 10-2017-0001351, filed in the Republic of Korea on Jan. 4, 2017 and Patent Application No. 10-2017-0001352, filed in the Republic of Korea on Jan. 4, 2017, all of which are hereby expressly incorporated by reference into the present application.

TECHNICAL FIELD

The present invention relates to a heating device, and more particularly, to a heating rod and a heating module included in a vehicular heating device.

BACKGROUND ART

Vehicles include an air-conditioning device for providing indoor thermal comfort, for example, a heating device for heating using a heater and a cooling device for cooling using refrigerant circulation.

In internal combustion engine vehicles according to the related art, a large amount of waste heat is generated in an engine. Thus, it is easy to obtain necessary heat for heating. On the other hand, less heat is generated in electric vehicles than in the internal combustion engine vehicles, and heating for a battery is required.

Thus, electric vehicles require an additional heating device, and improving energy efficiency of the heating device is significant.

Furthermore, because less heat is generated in the electric vehicles than in the internal combustion engine vehicles (for example, waste heat in the engine), it is particularly significant to reduce heat loss and to improve energy efficiency.

Furthermore, due to the emergence of smart vehicles, smart devices and displays having various functions are mounted on dashboards of the vehicles. As a result, the ratio of a blowing area of an air-conditioning system to the area of a dashboard of a vehicle is being reduced. That is, energy efficiency of a heater needs to be improved in correspondence to a blowing area of the air-conditioning system that is gradually being reduced according to demands of design.

Furthermore, in vehicular heaters according to the related art, due to low durability, structural damage occurs due to rocking of a car body caused by driving or external force. This damage causes malfunction of a heating system and thus solutions therefor are also required.

DISCLOSURE

Technical Problem

The present invention is directed to providing a heating rod and a vehicular heating device including the same.

The present invention is also directed to providing a heater having a stable structure and improved reliability.

The present invention is also directed to providing a heater having improved stability by sensing temperatures with different effects.

The present invention is also directed to providing a heater which is lightweight environmentally friendly.

The present invention is also directed to providing a heating module and a heater that provide an appropriate pressure drop.

The present invention is also directed to providing a heating module and a heater which is lightweight and capable of preventing environmental pollution.

Technical Solution

One aspect of the present invention provides a heating rod including a first thermal diffusion plate, a ceramic substrate disposed on the first thermal diffusion plate and having a heating element arranged therein, and a second thermal diffusion plate arranged on the ceramic substrate, wherein a plurality of layers are stacked in each of the first thermal diffusion plate and the second thermal diffusion plate.

An interface between two layers may be distinguished by pores.

A porosity of the interface between two layers may be less than a porosity of each layer.

The plurality of layers may include a first layer, a second layer disposed on one surface of the second layer, and a third layer disposed on one surface of the second layer, some pores between the first layer and the second layer may be filled with particles including a material of the second layer, and some pores between the second layer and the third layer may be filled with particles including a material of the third layer.

Each of the plurality of layers may include Copper (Cu).

Some of the plurality of layers may include Cu, and the remaining layers thereof may include one or more selected from the group consisting of molybdenum (Mo), silver (Ag), titanium (Ti), and aluminum (Al), and a layer including Cu and a layer including one or more selected from the group consisting of Mo, Ag, Ti, and Al may be alternately disposed.

The thickness of each layer may range from 1 to 300 μm, preferably, range from 5 to 100 μm, and more preferably, range from 10 to 30 μm.

The plurality of layers may be formed through screen printing.

The ceramic substrate may include a first ceramic layer, the heating element arranged on the first ceramic layer, a second ceramic layer arranged on the heating element, a first electrode terminal arranged on one surface of the first ceramic layer or the second ceramic layer and electrically connected to one end of the heating element, and a second electrode terminal arranged on one surface of the first ceramic layer or the second ceramic layer and electrically connected to the other end of the heating element, wherein a plurality of layers may be stacked in at least one of the first electrode terminal and the second electrode terminal. Here, at least one of the first electrode terminal and the second electrode terminal may be formed between the first ceramic layer and the second ceramic layer.

Another aspect of the present invention provides a heating rod including a first ceramic layer, a heating element arranged on the first ceramic layer, a second ceramic layer arranged on the heating element, a first electrode terminal positioned on one surface of the first ceramic layer or the second ceramic layer and electrically connected to one end of the heating element, and a second electrode terminal positioned on one surface of the first ceramic layer or the second ceramic layer and electrically connected to the other end of the heating element, wherein a plurality of layers are stacked in at least one of the first electrode terminal and the second electrode terminal. Here, at least one of the first electrode terminal and the second electrode terminal may be formed between the first ceramic layer and the second ceramic layer.

Another aspect of the present invention provides a heating device including a power module, and a heating module arranged on the power module and generating heat using power supplied from the power module, wherein the heating module includes a plurality of radiation fins and a plurality of heating rods, and each of the heating rods includes a first thermal diffusion plate, a ceramic substrate arranged on the first thermal diffusion plate and having a heating element arranged therein, and a second thermal diffusion plate arranged on the ceramic substrate, wherein a plurality of layers are stacked in each of the first thermal diffusion plate and the second thermal diffusion plate.

Another aspect of the present invention provides a heating module including a plurality of heating rods, and a plurality of radiation fins which are arranged between the plurality of heating rods and which are porous.

The porosities of the plurality of radiation fins may range from 10 to 100 pores per inch (ppi).

The porosities of the radiation fins may be 50 ppi.

Each of the heating rods may include at least one of $Si_3N_4$, $Al_2O_3$, and $ZrO_2$.

Each of the heating rods may further include a heating element.

The heating element may include at least one of carbon nanotubes (CNTs) and silver (Ag).

The radiation fins may include at least one of Al, Cu, Ni, and Ag.

The heating module may further include a coupling member arranged between one ends of the radiation fin and the heating rod and connecting the radiation fin to the heating rod.

Another aspect of the present invention provides a heater including a power module and a heating module electrically connected to the power module, wherein the heating module may include: a plurality of heating rods; and a plurality of radiation fins which are arranged between the plurality of heating rods and which are porous.

Another aspect of the present invention provides a heating system including a flow path on which air moves; an air supply portion through which air is introduced, an exhaust portion through which air is discharged to an inside of a moving unit, and a heater arranged between the air supply portion and the exhaust portion on the flow path and configured to heat air, wherein the heater may include: a power module; and a heating module electrically connected to the power module, wherein the heating module may include a plurality of heating rods, and a plurality of radiation fins which are arranged between the plurality of heating rods and which are porous.

Another aspect of the present invention provides a heater including a case, a heating module arranged in the case, and a power module electrically connected to the heating module, wherein the heating module includes a plurality of heating rods, a plurality of radiation fins arranged between two adjacent heating rods, and a gasket arranged at each of one side and the other side of an inside of the case.

The heater may further include a support portion arranged between the plurality of radiation fins.

At least one support portion identical to the support portion may be arranged between the adjacent heating rods.

The support portion may include Al.

The heater may further include a sensor that is in contact with the support portion.

The sensor may be a temperature sensor.

The temperature sensor may include at least one of a thermostat and a thermocouple.

The sensor may be disposed inside the support portion.

Each of the heating rods may include a first thermal diffusion plate, a second thermal diffusion plate, and a ceramic substrate arranged between the first thermal diffusion plate and the second thermal diffusion plate and having a heating element arranged therein.

A plurality of layers may be stacked in each of the first thermal diffusion plate and the second thermal diffusion plate.

The heating element may include at least one of tungsten (W) and molybdenum (Mo).

The heating element may include a thermistor.

The heater may further include a measurement portion, which senses resistance of the thermistor, and a calculation portion, which calculates temperature from the sensed resistance.

The first thermal diffusion plate and the second thermal diffusion plate may include the same material.

The first thermal diffusion plate and the second thermal diffusion plate may include at least one of Cu and Al.

Another aspect of the present invention provides a heating system including a flow path on which air moves, an air supply portion through which air is introduced, an exhaust portion through which air is discharged to an inside of a moving unit, and a heater arranged between the air supply portion and the exhaust portion on the flow path and configured to heat air, wherein the heater includes a case, a heating module arranged in the case, and a power module electrically connected to the heating module, wherein the heating module includes a plurality of heating rods, a plurality of radiation fins arranged between two adjacent heating rods, and a gasket arranged on each of one side and the other side of an inside of the case.

Advantageous Effects

According to embodiments of the present invention, a heating rod capable of fast heating and a vehicular heating device including the same can be provided.

In particular, according to one or more embodiments, a heating rod having high thermal diffusion performance and high surface resistivity can be obtained. Furthermore, according to one or more embodiments, it is easy to perform bonding between a ceramic substrate and a thermal diffusion plate and between a ceramic layer and an electrode terminal.

Furthermore, a heating module and a heater that provides an appropriate pressure drop can be manufactured.

Furthermore, a heating module and a heater which are lightweight and capable of preventing environmental pollution can be manufactured.

Furthermore, a heater having a stable structure and improved reliability can be manufactured.

Furthermore, a heater having improved stability by sensing temperatures with different effects can be manufactured.

Various and favorable advantages and effects of the present invention are not limited to the above description and will be more easily understood in the procedure of describing particular embodiments of the present invention.

DESCRIPTION OF DRAWINGS

FIG. 1 is a perspective view illustrating a heating device according to an embodiment of the present invention.

FIG. 2 is a plan view illustrating a heating module included in the heating device according to the embodiment of the present invention.

FIG. 3 is a cross-sectional view illustrating a heating rod according to an embodiment of the present invention.

FIG. 4 is a cross-sectional view illustrating a thermal diffusion plate according to an embodiment of the present invention.

FIGS. 5 and 6 are cross-sectional views illustrating a thermal diffusion plate according to another embodiment of the present invention.

FIG. 7 is a flowchart illustrating a method of manufacturing a heating rod according to an embodiment of the present invention.

FIG. 8 is a cross-sectional image of a thermal diffusion plate manufactured according to an embodiment of the present invention.

FIG. 9 is a cross-sectional view illustrating a ceramic substrate according to an embodiment of the present invention.

FIG. 10 is an exploded view illustrating a ceramic substrate according to an embodiment of the present invention.

FIG. 11 is a view illustrating various shapes of heating elements arranged on a ceramic substrate according to an embodiment of the present invention.

FIG. 12 is a plan view illustrating a heating module according to an embodiment of the present invention.

FIGS. 13 and 14 are enlarged photos showing surfaces of radiation fins including copper (Cu) and aluminum (Al) when the radiation fins have different porosities.

FIG. 15 is an enlarged view illustrating a portion A of FIG. 12.

FIGS. 16 and 17 are views illustrating various structures of a heating module.

FIG. 18 is a plan view illustrating a heating module according to an embodiment.

FIG. 19 is a side perspective view taken along line A-A' of the heating module illustrated in FIG. 18.

FIG. 20 is a side perspective view illustrating a modified example of the heating module of FIG. 19.

FIG. 21 is an exploded perspective view illustrating a heating rod according to an embodiment of the present invention.

FIG. 22 is a plan view illustrating a heating rod according to an embodiment of the present invention.

FIG. 23 is a side perspective view illustrating a support and a heating module according to an embodiment of the present invention.

FIG. 24 is a view illustrating a modified example of FIG. 23.

FIG. 25 is a conceptual view illustrating a heating system according to an embodiment of the present invention.

MODES OF THE INVENTION

As the present invention allows for various changes and numerous embodiments, particular embodiments will be illustrated in the drawings and described in detail in the written description. However, it should be understood that the present invention is not limited to the particular embodiments but may include all changes, equivalents, or substitutes included in the spirit and the technical scope of the present invention.

It will be understood that although the terms first and second are used herein to describe various elements, these elements should not be limited by these terms. These terms are only used to distinguish one element from another element. Thus, a second element discussed below could be termed a first element, and similarly, a first element may be termed a second element without departing from the teachings of this disclosure. As used herein, the term "and/or" includes any one or any combination of the associated listed items.

It will be understood that when an element is referred to as being "connected to" or "coupled to" another element, it may be directly connected or coupled to another element or intervening elements may be present. In contrast, when an element is referred to as being "directly connected to" or "directly coupled to" another element or layer, there are no intervening elements or layers present.

In the description of embodiments, it will be understood that when an element, such as each layer (film), region, pattern, or structure is formed "on" or "under" a substrate, the element may be formed "on" or "under" the substrate directly or with an intervening layer. Criterions of "on" or "under" each layer will be described based on the drawings. Also, in the drawings, the thicknesses or sizes of each layer (film), region, pattern, or structures may be changed for clarity and convenience of explanation and thus, actual sizes are not entirely reflected.

The terms used in the present specification are merely used to describe particular embodiments and are not intended to limit the present invention. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification and are not intended to preclude the possibility that one or more other features, numbers, steps, actions, components, parts, or combinations thereof may exist or may be added.

Unless otherwise defined, all terms (including technical and scientific terms) used herein have the same meaning as commonly understood by one of ordinary skill in the art to which exemplary embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in more detail with reference to the accompanying drawings. Those components that are the same or correspond to each other are rendered with the same reference numeral regardless of the figure number, and a redundant description thereof is omitted.

FIG. 1 is a perspective view of a heating device according to an embodiment of the present invention, and FIG. 2 is a plan view of a heating module included in the heating device according to the embodiment of the present invention.

Referring to FIGS. 1 and 2, a heating device 10 includes a case 100, a heating module 200, and a power module 300.

The case 100 may be an external member of the heating module 200. The case 100 may accommodate the heating module 200 therein, and the case 100 and the heating module 200 may be positioned on the power module 300.

The case 100 may have a cage shape, and air introduced from one surface 110 of the case 100 may be heated by the heating module 200 inside the case 100 and then discharged through another surface of the case 100.

In detail, the case 100 may have a hollow block shape. The case 100 may include a first surface and a second surface. Here, a plurality of inlets may be positioned on the first surface. Thus, a fluid may be introduced into the first surface. Here, the fluid may be a medium which transfers heat, for example, air. However, the embodiment is not limited to this type.

Also, the plurality of inlets may be arranged in a predetermined column on the first surface. The lengths of the inlets in a first direction (X-axis direction) may be diverse. However, embodiments are not limited to this shape.

A plurality of discharge ports may be arranged on the second surface. The fluid introduced into the first surface may be heated by the heating module 200 inside the case 100 and may move through the plurality of discharge ports on the second surface. The discharge ports may be arranged in a predetermined column on the second surface. Also, the discharge ports may be disposed to correspond to the plurality of inlets.

Thus, the fluid introduced through the inlets may be smoothly discharged through the discharge ports. The temperature of a fluid b-2 discharged through the discharge ports may be higher than the temperature of a fluid b1 introduced into the inlets.

Also, the lengths of the plurality of discharge ports in the first direction (X-axis direction) may be diverse. However, embodiments are not limited to this shape.

Also, the case 100 may be positioned outside a heater 1000. The case 100 may be an external member of the heater 1000 and may surround the heating module 200 accommodated in the case 100. A power module 300 may be positioned at one side of the case 100. The case 100 may be coupled to the power module 300.

The lower portion of the case 100 may include an accommodation portion to be coupled to the power module 300. For example, the case 100 and the power module 300 may be coupled to each other through insertion coupling. However, embodiments are not limited to this method. The heating module 200 may be positioned inside the case 100 and electrically connected to the power module 300. In detail, the heating module 200 may be electrically connected to the power module 300 positioned at one side of the case 100. The heating module 200 may provide heat using power provided from the power module 300. The heating module 200 includes radiation fins 220, heating rods 210, a first gasket 240, and a second gasket 250. A plurality of radiation fins 220 and a plurality of heating rods 210 may be alternately arranged, and the upper portions of the plurality of heating rods 210 may be supported by the first gasket 240, and the lower portions of the plurality of heating rods 210 may be supported by the second gasket 250. The lower portion of each of the plurality of heating rods 210 may be electrically connected to the power module 300 through the second gasket 250.

The plurality of radiation fins 220 and the plurality of heating rods 210 may be alternately bonded to one another. In this case, the plurality of radiation fins 220 and the plurality of heating rods 210 may be bonded to one another using a silver paste or thermal conductive silicon. Thus, heat generated in the heating rods 210 may be transferred to the radiation fins 220. The radiation fins 220 may be louver fins. However, embodiments are not limited thereto, and the radiation fins 220 may be implemented in various shapes in which the surface areas of the radiation fins 220 may be increased.

The heating device 10 according to the embodiment of the present invention may be either a heating device using an air heating technique or a heating device using coolant heating technique.

The power module 300 may be positioned at one side of the case 100. For example, the power module 300 may be positioned at the lower portion of the case 100 so as to support the case 100 and the heating module 200. Also, the power module 300 may be coupled to the case 100.

The power module 300 may be electrically connected to the heating module 200 and may provide power to the heating module 200. One side of the power module 300 may be connected to an external power supply device. A mass air flow (MAF) of the heater 1000 according to the embodiment may be 300 kg/h.

FIG. 3 is a cross-sectional view of a heating rod according to an embodiment of the present invention, and FIG. 4 is a cross-sectional view of a thermal diffusion plate according to an embodiment of the present invention.

Referring to FIG. 3, a heating rod 210 includes a first thermal diffusion plate 213, a ceramic substrate 211, and a second thermal diffusion plate 214.

The ceramic substrate 211 may be positioned between the first thermal diffusion plate 213 and the second thermal diffusion plate 214. The first thermal diffusion plate 213 and the second thermal diffusion plate 214 may diffuse heat generated in the ceramic substrate 211.

In this case, thermal expansion coefficients of the first thermal diffusion plate 213, the ceramic substrate 211, and the second thermal diffusion plate 214 may be the same or similar. For example, when the thermal expansion coefficient of the ceramic substrate 211 is 7 ppm/° C., the thermal expansion coefficient of each of the first thermal diffusion plate 213 and the second thermal diffusion plate 214 may also be 7 ppm/° C. Alternatively, with respect to the thermal expansion coefficient of the ceramic substrate 211, thermal expansion coefficients of the first thermal diffusion plate 213 and the second thermal diffusion plate 214 may range from 0.6 to 1.3 times, preferably, range from 0.8 to 1.2 times, and more preferably, range from 0.9 to 1.1 times. In this way, when the thermal expansion coefficients of the first thermal diffusion plate 213, the ceramic substrate 211 and the second thermal diffusion plate 214 are the same or similar, the ceramic substrate 211 may be prevented from being damaged due to thermal expansion.

Although not shown, by using a bonding layer, the first thermal diffusion plate 213 may be bonded to the ceramic substrate 211, and the ceramic substrate 211 may be bonded to the second thermal diffusion plate 214. In this case, the bonding layer may include an active metallic alloy including titanium (Ti), zirconium (Zr), or the like or a metallic oxide including copper oxide (CuO or $Cu_2O$). Alternatively, the bonding layer may include at least one selected from the group of aluminum oxide, aluminum nitride, silicon nitride, and silicon carbide. Because the bonding layer reacts with the ceramic substrate 211 due to heating and pressing, the first thermal diffusion plate 213 may be bonded to the ceramic substrate 211, and the ceramic substrate 211 may be bonded to the second thermal diffusion plate 214.

One ceramic substrate 211 is disposed between the first thermal diffusion plate 213 and the second thermal diffusion plate 214. However, embodiments are not limited thereto. A plurality of ceramic substrates 211 may be stacked and arranged between the first thermal diffusion plate 213 and the second thermal diffusion plate 214.

The ceramic substrate 211 may be a substrate formed of ceramics in which a heating element is embedded, which is lightweight as compared to a positive temperature coefficient (PTC) thermistor, contains no heavy metals such as lead (Pb) and the like, emits far infrared rays, and has high thermal conductivity.

Referring to FIGS. 3 through 4, a plurality of layers L1, L2, L3, . . . , and Ln may be stacked in each of the first thermal diffusion plate 213 and the second thermal diffusion plate 214. The thickness d of each layer of the plurality of layers L1, L2, L3, . . . , and Ln may range from 1 to 300 μm, preferably, range from 5 to 100 μm, and more preferably, range from 10 to 30 μm. The total thickness D of each of the first thermal diffusion plate 213 and the second thermal diffusion plate 214 may range from 20 to 500 μm, preferably, range from 40 to 300 μm, and more preferably, range from 100 to 300 μm.

In this case, an interface between two layers may be distinguished by pores thereof. That is, the porosity of the interface between two layers may be less than a porosity of each layer. For example, some pores between a first layer L1 and a second layer L2 disposed on one surface of the first layer L1 may be filled with particles including a material of the second layer L2, and some pores between the second layer L2 and a third layer L3 disposed on one surface of the second layer L2 may be filled with particles including a material of the third layer L3.

Thus, because the number of pores to be formed on the first thermal diffusion plate 213 and the second thermal diffusion plate 214 may be reduced, thermal conductivity performance may be improved, and strength may be increased. In particular, a bond strength at an interface between two layers may be increased.

In this case, as shown in FIG. 5, the plurality of layers L1, L2, L3, . . . , and Ln may include the same material, for example, copper (Cu). Alternatively, as shown in FIG. 6, some of the plurality of layers L1, L2, L3, . . . , and Ln may include Cu, and the remaining layers thereof may include one or more selected from the group consisting of molybdenum (Mo), gold (Ag), titanium (Ti), and aluminum (Al), and a layer including Cu and a layer including at least one selected from the group consisting of Mo, Ag, Ti, and Al may be alternately positioned.

The thermal diffusion plate may be formed through screen printing.

FIG. 7 is a flowchart illustrating a method of manufacturing a heating rod according to an embodiment of the present invention.

Referring to FIG. 7, after a ceramic substrate is provided (S700), the ceramic substrate is printed using a metal paste through screen printing (S710) and then is dried (S720).

In this case, the metal paste may include metal particles, a resin, a dispersion agent, glass frit, and a solvent, and 50 to 80 wt % metal particles may be included in the metal paste, and 0.05 to 3 wt % glass frit may be included in the metal paste. Here, the metal particles may include at least one selected from the group consisting of Cu, Mo, Ag, Ti, and Al. The glass frit may include one selected from the group consisting of calcium oxide (CaO), magnesium oxide (MgO), sodium oxide (Na$_2$O), silicon oxide (SiO$_2$), and titanium oxide (TiO$_2$) or a mixture thereof.

A drying process may be performed under an atmosphere of about 600 to 800° C. after the temperature rises to 10° C./min, for example. In this way, when, after the metal paste is screen printed, the metal paste is treated at a low temperature, for example, at 600 to 800° C., the probability that distortion of layers occurs may be reduced. However, when, after the ceramic substrate is screen-printed using the metal paste, the ceramic substrate is dried, pores may occur in the layers and surfaces thereof.

Next, operations S710 and S720 are repeatedly performed several times. Thus, pores formed in the surface of a metal layer dried after being screen-printed may be filled with a metal layer formed by subsequent screen printing. In this case, the metal pastes on each layer may be the same or different. For example, only a metal paste including Cu may be used, or a metal paste including Cu and a metal paste including one or more selected from the group consisting of Mo, Ag, Ti, and Al may be alternately used.

Next, a heating rod is manufactured by performing a sintering process (S730). In this case, the sintering process may be performed at 900° C. under an atmosphere of nitrogen. While the sintering process is performed, the glass frit within the metal paste may be used to perform bonding between the ceramic layer and the layer and bonding between layers.

In this way, when the first thermal diffusion plate 213 and the second thermal diffusion plate 214 are printed using screen printing a plurality of times, a low-temperature process, for example, at 600 to 800° C., may be performed. Thus, a problem of defects caused by distortion of the first thermal diffusion plate 213 and the second thermal diffusion plate 214 as a high-temperature process, for example, at 900° C. or higher, is undergone while the first thermal diffusion plate 213 and the second thermal diffusion plate 214 are stacked on the ceramic substrate 211 using a direct bond copper (DBC) technique, may be prevented from occurring. In particular, even when the ceramic substrate 211 includes nitride, such as silicon nitride having low bonding performance with metals, a thermal diffusion plate may be stacked using a low-temperature process.

FIG. 8 is a cross-sectional image of a thermal diffusion plate manufactured according to an embodiment of the present invention.

Referring to FIG. 8, after screen printing is performed on the thermal diffusion plate using a Cu paste once and then the thermal diffusion plate is dried, screen printing is performed again using a Cu paste once and then the thermal diffusion plate is dried. At least some pores at an interface between layers may be filled with Cu particles. Thus, the porosity of the whole of the thermal diffusion plate may be reduced, and a bonding strength between layers forming the thermal diffusion plate may be improved.

According to the embodiment of the present invention, the structure of the thermal diffusion plate may be similarly applied to an electrode terminal within the ceramic substrate.

FIG. 9 is a cross-sectional view of a ceramic substrate according to an embodiment of the present invention, FIG. 10 is an exploded view of the ceramic substrate according to the embodiment of the present invention, and FIG. 11 is a view illustrating various shapes of heating elements arranged on a ceramic substrate according to an embodiment of the present invention.

Referring to FIGS. 9 through 10, a ceramic substrate 211 includes a first ceramic layer 211a, a heating element 212 positioned on the first ceramic layer 211a, and a second ceramic layer 211b positioned on the heating element 212.

The first ceramic layer 211a and the second ceramic layer 211b may include alumina or silicon nitride. Alternatively, the first ceramic layer 211a and the second ceramic layer 211b may further include one selected from the group consisting of calcium oxide (CaO), magnesium oxide (MgO), sodium oxide ($Na_2O$), silicon oxide ($SiO_2$), and titanium oxide ($TiO_2$), or a mixture thereof. Alternatively, the first ceramic layer 211a and the second ceramic layer 211b may further include at least one selected from the group consisting of aluminum nitride (AlN) and boron nitride (BN). The thicknesses of each of the first ceramic layer 211a and the second ceramic layer 211b may range from 0.5 to 2 mm.

The heating element 212 is positioned on the first ceramic layer 211a and generates heat when electricity flows through the heating element 212. The heating element 212 may include one selected from the group consisting of tungsten (W), molybdenum (Mo), nickel (Ni), chromium (Cr), copper (Cu), silver (Ag), indium tin oxide (ITO), and barium titanium oxide (BaTiO), or a mixture thereof. The heating element 212 may be printed, patterned, applied, or deposited on the first ceramic layer 211a in various shapes, as shown in FIG. 11. For example, the heating element 212 may be formed to repeat a pattern that extends in a first direction, is turned up, and extends in a second direction opposite to the first direction, as shown in FIG. 11, or may be formed in a zigzag form, as shown in FIG. 11, or may be formed in a spiral shape, as shown in FIG. 11. In this way, the heating element 212 may include a plurality of heating patterns 212-1 and 212-2, which are connected to each other by a predetermined pattern and are spaced apart from each other. The larger the printed area of the heating element 212, the larger the amount of heating of the ceramic substrate 211. In the present specification, the heating element 212 may be used mixed with a resistor, a heating pattern, or the like.

Meanwhile, one end T1 of the heating element 212 may be connected to a first electrode terminal 261, and the other end T2 of the heating element 212 may be connected to a second electrode terminal 262. The first electrode terminal 261 and the second electrode terminal 262 are positioned on the second ceramic layer 211b. However, embodiments are not limited thereto, and the first electrode terminal 261 and the second electrode terminal 262 may be positioned on the first ceramic layer 211a, and one of the first electrode terminal 261 and the second electrode terminal 262 may be positioned on the first ceramic layer 211a, and the other one thereof may be also positioned on the second ceramic layer 211b. Alternatively, the first electrode terminal 261 and the second electrode terminal 262 may be positioned between the first ceramic layer 211a and the second ceramic layer 211b. When the first electrode terminal 261 or the second electrode terminal 262 is positioned on the outer surface of the first ceramic layer 211a or the second ceramic layer 211b, one end T1 of the heating element 212 and the first electrode terminal 261 or the other end T2 of the heating element 212 and the second electrode terminal 262 may be connected to each other via a through hole formed in the first ceramic layer 211a or the second ceramic layer 211b. In this way, one end T1 and the other end T2 of the heating element 212 may be electrically connected to the power module 300 via the first electrode terminal 261 and the second electrode terminal 262, and electricity may flow through the heating element 212.

According to the embodiment of the present invention, a plurality of layers L1, L2, . . . , and Ln may be stacked in each of the first electrode terminal 261 and the second electrode terminal 262. The thickness of each layer may range from 10 to 30 μm, and the total thickness of each of the first electrode terminal 261 and the second electrode terminal 262 may range from 100 to 300 μm.

In this case, an interface between two layers may be distinguished by pores. That is, the porosity of the interface between two layers may be less than a porosity of each layer. For example, some pores between a first layer L1 and a second layer L2 disposed on one surface of the first layer L1 may be filled with particles including a material of the second layer L2, and some pores between the second layer L2 and a third layer L3 disposed on one surface of the second layer L2 may be filled with particles including a material of the third layer L3.

Thus, because the number of pores to be formed on the first electrode terminal 261 and the second electrode terminal 262 may be reduced, surface resistance performance and electrical conductivity performance may be improved, and strength may be increased. In addition, a bonding strength at an interface between two layers may be increased.

In this case, the plurality of layers L1, L2, . . . , and Ln may include the same material, for example, Cu. Alternatively, some of the plurality of layers L1, L2, . . . , and Ln may include Cu, and the remaining layers thereof may include one or more selected from the group consisting of Mo, Ag, Ti, and Al.

According to the embodiment of the present invention, such an electrode terminal may be formed through screen printing.

Referring to FIG. 12, a heating module 200 according to an embodiment may include a plurality of heating rods 210, radiation fins 220, a coupling member 230', a first gasket 240, and a second gasket 250.

The plurality of heating rods 210 may be arranged inside a case 100. Each of the heating rods 210 may include electrode terminals. The electrode terminals (not shown) may be arranged on one end of each heating rod 210. The heating rod 210 may receive power from the power module 300 via electrode terminals (not shown) so as to perform heating. The plurality of heating rods 210 may be provided, however, the number of heating rods 210 is not limited thereto.

The plurality of heating rods 210 may be spaced apart from each other by a predetermined distance. A plurality of radiation fins 220 may be arranged between the plurality of heating rods 210.

The heating rods 210 are connected to the radiation fins 220 so that heat generated in the heating rods 210 may be provided to the radiation fins 220. Thus, a fluid that passes through the heating rods 210 and the radiation fins 220 may receive heat so that the temperature of the fluid may rise. For heat transfer, a thermal conductive member (not shown) may be positioned between the heating rods 210 and the radiation fins 220. The thermal conductive member (not shown) may include a conductive silicon, however, a material thereof is not limited.

The heating rod 210 may include a ceramic substrate 211 and thermal diffusion plates 213 and 214.

The ceramic substrate 211 may be arranged between the plurality of thermal diffusion plates 213 and 214. The thermal diffusion plates 213 and 214 may diffuse heat generated in the ceramic substrate 211.

In this case, thermal expansion coefficients of the thermal diffusion plates 213 and 214 and the ceramic substrate 211 may be the same or similar. For example, when the thermal expansion coefficient of the ceramic substrate 211 is 7 ppm/° C., the thermal expansion coefficient of each of the thermal diffusion plates 213 and 214 may be 7 ppm/° C. Alternatively, the thermal expansion coefficients of the thermal diffusion plates 213 and 214 with respect to the thermal expansion coefficient of the ceramic substrate 211 may range from 0.8 ppm/° C. to 1.2 ppm/° C. In this way, when the thermal expansion coefficients of the thermal diffusion plates 213 and 214 and the ceramic substrate 211 are the same or similar, the ceramic substrate 2H 211 may be prevented from being damaged due to thermal expansion. However, embodiments are not limited to this configuration, and the heating rods 210 may include the ceramic substrate 211 without the thermal diffusion plates 213 and 214.

Also, although not shown, by using a bonding layer (not shown), the thermal diffusion plates 213 and 214 may be bonded to the ceramic substrate 211, and the ceramic substrate 211 may be bonded to the thermal diffusion plates 213 and 214. In this case, the bonding layer (not shown) may include an active metal alloy including titanium (Ti) and zirconium (Zr) or a metal oxide including copper oxide (CuO or $Cu_2O$). Alternatively, the bonding layer (not shown) may include at least one of aluminum oxide, aluminum nitride, silicon nitride, and silicon carbide. Because the bonding layer (not shown) reacts with the ceramic substrate 211 due to heating and pressing, the thermal diffusion plates 213 and 214 may be bonded to the ceramic substrate 211, and the ceramic substrate 211 may be bonded to the thermal diffusion plates 213 and 214.

Also, the ceramic substrate 211 may include a heating element therein. The heating element may include at least one of carbon nanotubes (CNTs) and Ag. The heating element may be electrically connected to an electrical terminal. The heating element may receive power from the outside via the electrical terminal and may perform heating.

The example of one ceramic substrate 211 disposed between the plurality of thermal diffusion plates 213 and 214 has been described. However, embodiments are not limited thereto. A plurality of ceramic substrates 211 may be stacked between the plurality of thermal diffusion plates 213 and 214.

The ceramic substrate 211 may be a substrate formed of ceramics in which a heating element is embedded and which includes at least one of $Al_2O_3$, $Si_3N_4$ and $ZrO_2$.

The ceramic substrate 211 may be lightweight as compared to a PTC thermistor, may include no heavy metal, such as Pb, may emit far infrared rays, and may have high thermal conductivity.

The radiation fins 220 may be arranged between the plurality of heating rods 210. The radiation fins 220 may be porous. The radiation fins 220 may include porous materials and may include a plurality of pores P.

The pores P of the radiation fins 220 may be controlled in various ways using a manufacturing method.

The radiation fins 220 may include at least one of Al, Cu, Ni, and Ag and may include an alloy or metal compound.

The pores P may have a spherical shape or cylindrical shape, and the shape of the pores P is not limited thereto. Also, the pores P may have a size in the range of several nanometers to several millimeters.

The radiation fins 220 may be formed through a fine casting technique including electroplating, electroless plating, and a metal deposition technique.

For example, the radiation fins 220 may be formed through a precipitation or deposition process of a chemical solution including at least one of Al, Cu, Ni, and Ag.

A heat treatment process or annealing process may be further performed on the radiation fins 220 so as to densify a metal structure, however, embodiments are not limited thereto.

Also, the radiation fins 220 may be formed through chemical dissolving or etching, and a sacrificial layer etching process may be applied to the radiation fins 220.

According to this manufacturing process, the radiation fins 220 may have various porosities. Here, the porosities may be the ratio of a volume of the porosities with respect to the total volume of the radiation fins 220.

The porosities of the radiation fins 220 may range from 10 pores per inch (ppi) to 100 ppi. Preferably, the porosities of the radiation fins 220 may be 50 ppi.

The following Table 1 shows a heater temperature and pressure drop according to the porosities of the radiation fins 220.

TABLE 1

| | Porosity (ppi) | Heater temperature (° C.) | Pressure drop (%) |
|---|---|---|---|
| Comparative example 1 | 0 to less than 10 | 10 | 4 |
| Example 1 | 10 | 30 | 12 |
| Example 2 | 30 | 45 | 32 |
| Example 3 | 50 | 62 | 48 |
| Example 4 | 80 | 50 | 67 |
| Example 5 | 100 | 43 | 78 |
| Comparative example 2 | greater than 100 | 10 | 90 |

Referring to Table 1, when a porosity ranges from 0 to less than 10 ppi (Comparative example 1) or a porosity is greater than 100 ppi (Comparative example 2), the heater temperature according to the radiation fins 220 may be 10° C. Here, the heater temperature means a temperature of the fluid transferred by a heater via the radiation fins 220.

In this way, when the porosity is in the range of 0 to less than 10 ppi or greater than 100 ppi, heat of room temperature or higher cannot be provided. Also, the temperature of heat radiated by the radiation fins 220 is low so that a temperature rising speed with respect to the introduced fluid may be reduced.

When the porosity is greater than 100 ppi, a pressure drop may be 90%. Here, the pressure drop means the ratio of the introduction amount of the fluid per time and the discharge amount of the fluid per time after heat exchange of the introduced fluid occurs in the radiation fins 220. That is, as the pressure drop gets closer to 100%, the introduction amount and the discharge amount of the fluid per time may be the same.

Thus, when the porosity is greater than 100 ppi, the amount of the discharged fluid is similar to the amount of the introduced fluid but the heater temperature is low such that heat cannot be sufficiently provided to the fluid. When the porosity ranges from 10 to 100 ppi (Examples 1 to 5), the heater temperature is greater than or equal to 43° C., and the pressure drop may range from 12% to 78%.

FIGS. 13 and 14 are enlarged photos showing surfaces of radiation fins including copper (Cu) and aluminum (Al) when the radiation fins have different porosities. FIG. 13 is an enlarged photo showing the surfaces of radiation fins 220 including Cu, and FIG. 14 is an enlarged photo showing the surfaces of the radiation fins 220 including Al.

Referring to FIGS. 13 and 14, in FIGS. 13A and 14A, the porosity of the radiation fins 220 is 50 ppi, and in FIGS. 13B and 14B, the porosity of the radiation fins 220 is 100 ppi. When the porosity of the radiation fins 220 is large, the amount of the fluid that passes through the radiation fins 220 is increased so that the pressure drop may be increased.

However, because the heater temperature is affected by heat exchange between the radiation fins 220 and the fluid, when the porosity is high, heat transfer is performed in only part of the fluid so that heat cannot be sufficiently transferred to all of the fluid. Also, when the porosity is small, movement of the fluid per unit time is fast so that heat may not be properly transferred to the fluid from the radiation fins 220.

Referring back to Table 1, when the porosity of the radiation fins 220 ranges from 10 to 100 ppi, the heater temperature may be 43° C. or higher. That is, a heater according to the embodiment may provide a fluid at room temperature or higher. That is, heat may be properly transferred to the fluid.

Also, when the porosity of the radiation fins 220 is 50 ppi, the heater temperature may be the highest temperature of 62° C. As described above, when the porosity of the radiation fins 220 is 50 ppi, the heater according to the embodiment may provide a highest temperature rising speed (° C./min). Thus, heat transfer to the fluid that passes through the radiation fins 220 may be performed at the greatest ratio.

Also, the pressure drop may range from 12% to 78%. Thus, movement of the fluid per unit time is slow so that heat transfer may be performed.

A manufacturing process of the radiation fins 220 according to the embodiment is simple as compared to Louver fins having a complicated manufacturing assembling process, and the radiation fins 220 are porous and be lightweight.

FIG. 15 is an enlarged view of portion A of FIG. 12. Referring to FIG. 15, the heating rod 210 and the radiation fin 220 may be disposed to be in contact with each other. The heating rod 210 that comes into contact with one surface of the radiation fin 220 may be provided with a plurality of heating rods, but is not limited thereto. The radiation fins 220 may include holes H in both ends thereof.

A coupling member 230' is disposed at one end of the radiation fin 220 and the heating rod 210 so as to connect the radiation fin 220 to the heating rod 210. The coupling member 230' may be disposed at both ends of the radiation fin 220 and the heating rod 210 so as to cover part of the radiation fin 220 and the heating rod 210. Also, the coupling member 230' according to the embodiment may be provided with a plurality of coupling members.

Also, the coupling member 230' may surround part of the hole H, and an adjacent coupling member 230' may surround the remaining part of the hole H. Through this configuration, the heating rod 210 and the radiation fin 220 may be fixedly coupled to each other. However, the structure of the coupling member 230' is not limited to this structure, and the coupling member 230' may be manufactured in an integrated type.

Also, the coupling member 230' may be formed of an electrothermal material. For example, the coupling member 230' may include Al but is not limited to this material.

FIGS. 16 and 17 illustrate various structures of a heating module 200. Referring to FIG. 16, fixed fins F may be further disposed on the heater. The plurality of the fixed fins F may be provided, but the embodiment is not limited to the number of the fixed fins.

Referring to FIG. 16, the fixed fins F may surround the heater in the first direction (X-axis direction). The fixed fins F allow the heating rods 210 and the radiating fins 220 to be entirely in contact with one another. Through this configuration, heat generated in the heating rods 210 may be transferred to the radiation fins 220. Also, the fixed fins F may improve structural stability of the heater.

Referring to FIG. 17, a coupling member 230' that covers one ends of the heating rods 210 and one ends of the radiation fins 220 may be positioned in the second direction (Z-axis direction). The coupling member 230' may have a cap shape but is not limited to this shape.

The coupling member 230' allows the radiation fins 220 and the heating rods 210 to be entirely in contact with one another. Also, the coupling member 230' may be positioned between the heating rods 210 and the radiation fins 220 and the first gasket 240. Also, the coupling member 230' may be positioned between the heating rods 210, the radiation fins 220 and the second gasket 250.

The first gasket 240 may be positioned at one inner side of the case 100. The second gasket 250 may be positioned at a lower inner side of the case 100. The first gasket 240 and the second gasket 250 may be coupled to the case 100 through insertion, adhesion, etc.

A plurality of first accommodation portions 241 and a plurality of second accommodation portions 251 may be positioned in the first gasket 240 and the second gasket 250 and may be spaced apart from one another in the first direction (X-axis direction). The first gasket 240 may include a plurality of protruding first accommodation portions 241. The second gasket 250 may include a plurality of protruding second accommodation portions 251.

The plurality of first accommodation portions 241 and the plurality of second accommodation portions 251 may correspond one-to-one to the plurality of heating rods 210. Through this configuration, one side of each of the heating rods 210 may be inserted into the first accommodation portion 241. Also, the other side of each of the heating rods 210 may be inserted into the second accommodation portion 251.

However, electrode terminals of the heating rods 210 may pass through lower sides of the second accommodation portions 251 and may extend downwards. Thus, the electrode terminals may be exposed to the lower sides of the second accommodation portions 251 and may be electrically connected to the power module 300. However, the electrode terminals of the heating rods 210 are not limited to this shape but may be connected to power supply using various methods.

Referring to FIG. 18, a heating module 200 according to an embodiment may include a plurality of heating rods 210, radiation fins 220, a support portion 232, a first gasket 240, and a second gasket 250.

The heating rods 210 may be heating portions and positioned inside the case 100. The heating rods 210 may receive power from the power module 300 to perform heating. There may be the plurality of heating rods 210, however, the number of heating rods 210 is not limited to this number.

The plurality of heating rods 210 may be spaced apart from one another by a predetermined distance. A plurality of radiation fins 220 may be positioned between the plurality of heating rods 210. The support portion 232 may be positioned between the plurality of radiation fins 220.

The heating rods 210 and the radiation fins 220 may be connected to one another, and heat generated in the heating rods 210 may be provided to the radiation fins 220. Thus, the fluid that passes through the heating rods 210 and the radiation fins 220 may receive heat, and the temperature of the fluid may be risen. For heat transfer, a thermal conductive member (not shown) may be positioned between the heating rods 210 and the radiation fins 220. The thermal conductive member (not shown) may include a conductive silicon, however, a material thereof is not limited.

Referring to FIG. 19, the heating rods 210 may extend from a lower side to an upper side. The heating rods 210 may include a ceramic substrate 211, a heating element 212, a first thermal diffusion plate 213, a second thermal diffusion plate 214, a first electrode terminal 261, a second electrode terminal 262, and a cover portion 217.

The ceramic substrate 211 may be positioned inside the heating rods 210 and may accommodate a heating element. The ceramic substrate 211 may be formed of ceramics.

The heating rods 210 according to the present embodiment may have a smaller weight than that of a PTC thermistor due to the ceramics covering the heating element 212, may include no heavy metal such as Pb, may emit far infrared rays, and may have high thermal conductivity.

A first thermal diffusion plate 213 may be disposed at one side of the ceramic substrate 211. A second thermal diffusion plate 214 may be disposed at the other side of the ceramic substrate 211. The ceramic substrate 211 may be accommodated in the cover portion 217 together with the first thermal diffusion plate 213 and the second thermal diffusion plate 214. The ceramic substrate 211 may include a first ceramic layer 211a and a second ceramic substrate 211b.

The first ceramic layer 211a may be disposed at one side of the ceramic substrate 211, and the second ceramic layer 211b may be disposed at the other side of the ceramic substrate 211. The heating element 212 may be disposed on one surface of the first ceramic layer 211a through printing, patterning, or deposition. After the heating element 212 is disposed in the first ceramic layer 211a, the first ceramic layer 211a and the second ceramic layer 211b may be sintered (at 1500° C.) and may form the ceramic substrate 211 in an integrated type. Through this configuration, one surface of the first ceramic layer 211a and one surface of the second ceramic layer 211b that is in contact with one surface of the first ceramic layer 211a may be aligned and sintered.

A first electrode terminal 261 and a second electrode terminal 262 may be disposed between the first ceramic layer 211a and the second ceramic substrate 211b. The first electrode terminal 261 and the second electrode terminal 262 may be coupled to the first ceramic layer 211a and the second ceramic substrate 211b.

Also, the first electrode terminal 261 and the second electrode terminal 262 may be electrically connected to the heating element 212. The first electrode terminal 261 and the second electrode terminal 262 may be positioned at outer surfaces of the first ceramic layer 211a and the second ceramic substrate 211b. In this case, an additional lead line (not shown) for electrically connecting the first electrode terminal 261 and the second electrode terminal 262 to the heating element 212 may be disposed.

The heating element 212 may be disposed inside the ceramic substrate 211. The heating element 212 may be disposed on the first ceramic layer 211a through printing, patterning, deposition, or the like. The heating element 212 may be disposed on a surface on which the first ceramic layer 211a and the second ceramic layer 211b are in contact with each other.

The heating element 212 may be a resistor line. The heating element 212 may be a resistor formed of a material such as tungsten (W), molybdenum (Mo), or the like. Thus, the heating element 212 may be heated when electricity flows through the heating element 212. The heating element 212 may extend from one side to the other side of the first ceramic layer 211a and may be turned up (curved or bent) at the other side of the first ceramic layer 211a. The heating element 212 may extend from the other side to one side of the first ceramic layer 211a. The extension of the heating element 212 may be repeated, and thus the heating element 212 may be stacked in the second direction (Y-axis direction) in which the fluid passes.

Through this configuration, the fluid may sequentially pass through portions of the heating rods 210 in which heating occurs while passing through the heating module 200 and may receive heat. That is, due to an arrangement shape of the heating element 212, the area in which the fluid and heat generated in the heating rods 210 are in contact with each other may be increased.

Each of both ends of the heating element 212 may be electrically connected to one of the first electrode terminal 261 and the second electrode terminal 262.

The heating element 212 may receive power from the power module 300 through the first electrode terminal 261 and the second electrode terminal 262. Thus, a current may flow through the heating element 212, and heat may be generated in the heating element 212. Power supplied to the heating element 212 may be controlled by the power module 300.

The first thermal diffusion plate 213 and the second thermal diffusion plate 214 may be disposed at both sides of the ceramic substrate 211. Thus, a ceramic substrate 211 may be disposed between the first thermal diffusion plate 213 and the second thermal diffusion plate 214. For example, the first thermal diffusion plate 213 may be coupled to side surfaces of the first ceramic layer 211a, and the second thermal diffusion plate 214 may be coupled to side surfaces of the second ceramic substrate 211b.

The first thermal diffusion plate 213 and the second thermal diffusion plate 214 may be coupled to the first ceramic layer 211a and the second ceramic layer 211b due to an active metal layer. Here, the active metal layer may be a titanium family active metal alloy. The active metal layer may be disposed between the first ceramic layer 211a and the first thermal diffusion plate 213. Also, the active metal layer may be disposed between the second ceramic layer 211b and the second thermal diffusion plate 214.

The active metal layer may react with ceramics of the first ceramic layer 211a and the second ceramic layer 211b and may form an oxide or nitride. Thus, the first thermal diffusion plate 213 and the second thermal diffusion plate 214 may be in contact with the first ceramic layer 211a and the second ceramic layer 211b and may be coupled thereto.

The first thermal diffusion plate 213 may have a shape in which a plurality of diffusion layers are stacked. Here, the plurality of diffusion layers may be formed by hot pressing. Similarly, the second thermal diffusion plate 214 may have a shape in which a plurality of diffusion layers are stacked, and the plurality of diffusion layers may be formed by hot pressing. The plurality of diffusion layers may include copper (Cu) or aluminum (Al).

Thermal expansion coefficients of the first thermal diffusion plate 213 and the second thermal diffusion plate 214 may be determined according to predetermined conditions by reflecting the thermal expansion coefficient of the ceramic substrate 211. That is, the thermal expansion coefficients of the first thermal diffusion plate 213 and the second thermal diffusion plate 214 may be similar to the thermal expansion coefficient of the ceramic substrate 211.

Also, the thermal expansion coefficients of the first thermal diffusion plate 213 and the second thermal diffusion plate 214 may be the same as the thermal expansion coefficient of the ceramic substrate 211. As a result, the ceramic substrate 211, which has high thermal conductivity but is brittle and thus may be damaged by thermal shock, may be reinforced.

A difference between the thermal expansion coefficient of the ceramic substrate 211 and the thermal expansion coefficients of the first thermal diffusion plate 213 and the second thermal diffusion plate 214 may be the same, including a difference of zero, or in the range from 0.1 to 0.9. Preferably, the difference between the thermal expansion coefficient of the ceramic substrate 211 and the thermal expansion coefficients of the first thermal diffusion plate 213 and the second thermal diffusion plate 214 may be in the range from 0.1 to 0.5. When the difference between the thermal expansion coefficient of the ceramic substrate 211 and the thermal expansion coefficients of the first thermal diffusion plate 213 and the second thermal diffusion plate 214 is greater than 0.9, the ceramic substrate 211 may be broken.

However, the first thermal diffusion plate 213 and the second thermal diffusion plate 214 may be additional configurations that may be changed according to a design request. One of the first thermal diffusion plate 213 and the second thermal diffusion plate 214 may be omitted from the heating rods 210. Also, both the first thermal diffusion plate 213 and the second thermal diffusion plate 214 may be omitted from the heating rods 210.

The electrode portion 260 may be disposed at one end of the heating rods 210 and may be electrically connected to the heating rods 210. The electrode portion 260 may include a first electrode terminal 261 and a second electrode terminal 262. The first electrode terminal 261 and the second electrode terminal 262 may be electrically connected to the heating element 212 within the ceramic substrate 211.

Also, the first electrode terminal 261 and the second electrode terminal 262 may be electrically connected to the power module 300. Thus, power of the power module 300 may be provided to the heating module 200.

A material of the cover portion 217 may include aluminum (Al). The cover portion 217 may have a hollow bar or rod shape that is an external member of the heating rods 210, however, a shape thereof is not limited.

The cover portion 217 may accommodate the ceramic substrate 211, the heating element 212, the first thermal diffusion plate 213, and the second thermal diffusion plate 214 therein. In this case, an inner surface 217a of the cover portion 217 may be in contact with the ceramic substrate 211, the first thermal diffusion plate 213, and the second thermal diffusion plate 214.

Thermal conductive silicon may be disposed between the cover portion 217 and the ceramic substrate 211 and between the first thermal diffusion plate 213 and the second thermal diffusion plate 214. The cover portion 217 may be bonded to the ceramic substrate 211, the first thermal diffusion plate 213, and the second thermal diffusion plate 214 due to the thermal conductive silicon.

The cover portion 217 may surround the ceramic substrate 211, the first thermal diffusion plate 213, and the second thermal diffusion plate 214 and may protect the ceramic substrate 211, the first thermal diffusion plate 213, and the second thermal diffusion plate 214.

Also, the cover portion 217 may have high thermal conductivity and thus may transfer heat generated in the heating element 212 of the ceramic substrate 211 to the radiation fins 220 that are in contact with the heating rods 210.

Also, the cover portion 217 may be inserted into the first gasket 240 and the second gasket 250. The cover portion 217 may be inserted into the first gasket 240 and the second gasket 250 to support the heating module 200 according to the embodiment.

However, the cover portion 217 may be changed according to demands of a design and thus is not limited to this shape.

Referring back to FIG. 18, the radiation fins 220 may be disposed inside the case 100. The radiation fin 220 may be disposed between the plurality of heating rods 210 and may be provided with a plurality of radiation fins. The plurality of radiation fins 220 may be spaced apart from one another in the first direction (X-axis direction). A support portion 232 may be disposed between the plurality of radiation fins 220.

The radiation fins 220 may extend in a third direction (Z-axis direction), as in the heating rods 210. The radiation fins 220 may be Louver fins but are not limited thereto. The radiation fins 220 may have a shape in which inclined plates are stacked in the third direction (Z-axis direction). Thus, the radiation fins 220 may include a plurality of clearances through which the fluid passes. The fluid may pass through the plurality of clearances and may receive heat. Due to these radiation fins 220, a heat transfer area in which heat generated in the heating rods 210 is transferred to the fluid, may be increased so that heat transfer efficiency may be improved.

A length L of the radiation fin 220 in the first direction (X-axis direction) may range from 8 to 16 mm. When the length L of the radiation fin 220 in the first direction (X-axis direction) is less than 8 mm, an MAF of the heater 1000 may be reduced, and when the length L of the radiation fin 220 in the first direction (X-axis direction) is greater than 16 mm, heat transfer to the passing fluid is not properly performed so that there is a limitation in which a temperature rising ratio of the fluid may be lowered.

Also, a length W1 of the radiation fin 220 in the third direction (Z-axis direction) may range from 180 to 220 mm. A length W2 of the heating module 200 in the first direction (X-axis direction) may range from 160 to 200 mm.

The support portion 232 may be disposed between the plurality of radiation fins 220. The support portion 232 may be disposed between the plurality of radiation fins 220. At least one support portion 232 may be disposed between the adjacent heating rods 210.

The support portion 232 may support the heating rods 210 and the radiation fins 220 and prevent the heating rods 210 and the radiation fins 220 from being bent from an external force. A length of the support portion 232 in the first direction (X-axis direction) may range from 0.4 to 0.6 mm. When the length of the support portion 232 in the first direction (X-axis direction) is less than 0.4 mm, there is a limitation in which the amount of the fluid discharged through the heater 1000 may be reduced. When the length of the support portion 232 in the first direction (X-axis direction) is greater than 0.6 mm, the number of pores of the radiation fins 220 may be reduced so that heat to be transferred to the fluid may be reduced.

The support portion 232 may be disposed between the heating rods 210 and disposed in the middle of the adjacent heating rods 210. Through this configuration, a force may be equally distributed from an external force so that damage to the heater 1000 may be minimized.

The first gasket 240 may be positioned at one inner side of the case 100. The second gasket 250 may be positioned at a lower inner side of the case 100. The first gasket 240 and the second gasket 250 may be coupled to the case 100 through insertion, bonding, or the like.

A plurality of first accommodation portions 241 and a plurality of second accommodation portions 251 may be positioned in the first gasket 240 and the second gasket 250 and may be spaced apart from one another in the first direction (X-axis direction). The first gasket 240 may include the plurality of protruding first accommodation portions 241. The second gasket 250 may include the plurality of protruding second accommodation portions 251.

The plurality of first accommodation portions 241 and second accommodation portions 251 may correspond one-to-one to the plurality of heating rods 210. Through this configuration, one side of each of the heating rods 210 may be inserted into the first accommodation portion 241. Also, the other side of each of the heating rods 210 may be inserted into the second accommodation portion 251.

However, the electrode portion 260 of the heating rods 210 may pass through the lower side of the second accommodation portion 251 and may extend downwards. Thus, the first electrode terminal 261 and the second electrode terminal 262 may be exposed to the lower side of the second accommodation portion 251 and may be electrically connected to the power module 300.

FIG. 19 is a side perspective view taken along line AA' of the heating module according to the embodiment of FIG. 18.

Referring to FIG. 19, the support portion 232 according to the embodiment may prevent the radiation fins 220 and the heating rods 210 from being bent even when an external force F is applied to the radiation fins 220 and the heating rods 210.

Thus, a reduction in the MAF of the heater 1000 due to bending of the radiation fins 220 may be prevented. Also, lowering of heat exchange efficiency that occurs when the fluid passes through the radiation fins 220 may be prevented. Also, damage to the radiation fins 220 may be prevented so that reliability of the heater 1000 due to mechanical defects may be improved.

FIG. 20 is a side perspective view of a modified example of the heating module of FIG. 19, FIG. 21 is a plan view of heating rods according to an embodiment, and FIG. 22 is a plan view of the heating rods according to the embodiment.

Referring to FIGS. 20 through 22, a plurality of support portions 232 may be positioned between the heating rods 210. In FIG. 21, there are two support portions 232, however, the number of the support portions 232 is not limited thereto. The plurality of support portions 232 may be positioned between the heating rods 210. Thus, mechanical reliability of the heater 1000 may be significantly improved.

The heating element 212 within the ceramic substrate 211 of the heating rods 210 may be a thermistor. As described above, the first electrode terminal 261 and the second electrode terminal 262 may be connected to both ends of the heating element 212.

Here, a measurement portion 270 may be connected to the first electrode terminal 261 and the second electrode terminal 262. The measurement portion 270 may measure resistance of the thermistor from both-end voltages/currents of the first electrode terminal 261 and the second electrode terminal 262.

A calculation portion 280 may calculate the temperature of the thermistor from the resistance of the thermistor which is the heating element 212. The calculation portion 280 may calculate the temperature of the thermistor from already-stored data regarding the relation between resistance and temperature or an equation thereof. The calculated temperature may be transmitted to the outside through a communication portion (not shown).

Through this configuration, by sensing the temperature of the heating rods 210, when the heater 1000 according to the embodiment is installed at a vehicle, plastics adjacent to the heating rods 210 may be prevented from being degraded and deformed. Thus, fire or the like may be prevented.

FIG. 23 is a side perspective view illustrating a support portion and a heating module according to an embodiment.

Referring to FIG. 23, a sensor 290 may be disposed on the support portion 232. The sensor 290 may include a temperature sensor. The sensor 290 may be disposed at one side of the support portion 232. For example, for precise temperature measurement of the support portion 232, the sensor 290 may be disposed on a surface on which the fluid is discharged. Also, the temperature sensor may include at least one of a thermostat and a thermocouple. However, the temperature sensor is not limited to this type.

Through this configuration, the sensor 290 may sense the temperature of an area in which the fluid is discharged. Thus, the temperature of the fluid discharged through a discharge port may be precisely measured so that a user may control the heater 1000 more quickly.

FIG. 24 is a modified example of FIG. 23. Referring to FIG. 24, the sensor may be positioned within a support portion. Thus, the sensor may be protected from an external shock.

FIG. 25 is a conceptual view illustrating a heating system according to an embodiment.

Referring to FIG. 25, a heating system 2000 according to the present embodiment may be used in various moving units. Here, the moving unit is not limited to a vehicle driven on a land, such as a car, but may include a ship, an airplane, or the like. However, hereinafter, an example of a case where the heating system 2000 according to the present embodiment is used in a car will be described.

The heating system 2000 may be accommodated in an engine room of the car. The heating system 2000 may include an air supply portion 400, a flow path 500, an exhaust portion 600, and a heater 1000.

A variety of air supply devices, such as a blower fan, a pump, or the like, may be used as the air supply portion 400. The air supply portion 400 may move the fluid outside the heating system 2000 to the inside of the flow path 500 that will be described below and may allow the fluid to move along the flow path 500.

The flow path 500 may be a path on which the fluid flows. The air supply portion 400 may be positioned at one side of the flow path 500, and the exhaust portion 600 may be positioned at the other side of the flow path 500. The flow path 500 may connect the engine room of the car to the inside of the car in an air-conditioning manner.

Openable blades may be used as the exhaust portion 600. The exhaust portion 600 may be positioned at the other side of the flow path 500. The exhaust portion 600 may communicate with the inside of the car. Thus, the fluid that moves along the flow path 500 may be introduced into the inside of the car via the exhaust portion 600.

The heater 1000 according to the above-described embodiment may be used as the heater 1000 of the heating system 2000. Hereinafter, a description of the same technical spirit will be omitted. The heater 1000 having a barrier wall shape may be positioned in the middle of the flow path 500. In this case, forward/backward directions of the heater 1000 may be the same as or similar to forward/backward directions of the car. A cold fluid in the engine room, to which air is supplied by the air supply portion 400 via the flow path 500, may transmit through the heater 1000 from front to back and may be heated and then flow along the flow path 500 again and be supplied to the inside of the car through the exhaust portion 600.

Additionally, in the heater 1000 according to the present embodiment, heat transfer may be performed by a heating element covered by a ceramic substrate, unlike in an existing PTC thermistor. Thermal efficiency may be improved using a high heating amount of the heating element. Also, the high heating amount of the heating element may be covered with ceramics having a high thermal transfer rate so that thermal stability may be achieved and thermal efficiency may be maintained.

Furthermore, the heater 1000 according to the present embodiment may include no heavy metals such as Pb and may have a small weight.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A heating rod comprising:
   a first thermal diffusion plate;
   a ceramic substrate disposed on the first thermal diffusion plate and having a heating element arranged therein; and
   a second thermal diffusion plate arranged on the ceramic substrate,
   wherein the first thermal diffusion plate and the second thermal diffusion plate are stacked in a plurality of layers respectively,
   wherein the plurality of layers include a first layer and a second layer disposed on the first layer,
   wherein an interface is provided between the first layer and the second layer, and
   wherein the first layer has an inner porosity greater than a porosity of the interface between the first layer and the second layer.

2. The heating rod of claim 1, wherein the porosity of the interface between the first layer and the second layer comprises particles including a material of the second layer.

3. The heating rod of claim 1, wherein the first layer comprises copper (Cu), and
   wherein the second layer comprises one or more selected from the group consisting of molybdenum (Mo), silver (Ag), titanium (Ti), and aluminum (Al).

4. The heating rod of claim 3, wherein the first layer and the second layer are alternately arranged.

5. The heating rod of claim 1, wherein the first layer and the second layer have thicknesses of 1 μm to 300 μm respectively.

6. The heating rod of claim 1, wherein the first layer and the second layer are formed through screen printing.

7. The heating rod of claim 1, wherein the ceramic substrate comprises:
   a first ceramic layer;
   the heating element arranged on the first ceramic layer;
   a second ceramic layer arranged on the heating element;
   a first electrode terminal arranged on one surface of the first ceramic layer or the second ceramic layer and electrically connected to one end of the heating element; and
   a second electrode terminal arranged on one surface of the first ceramic layer or the second ceramic layer and electrically connected to an opposite end of the heating element, and
   wherein a plurality of layers are stacked in at least one of the first electrode terminal and the second electrode terminal.

8. The heating rod of claim 7, wherein the at least one of the first electrode terminal and the second electrode terminal is disposed between the first ceramic layer and the second ceramic layer.

9. A heating module comprising:
   a plurality of heating rods; and
   a plurality of radiation fins arranged between two adjacent heating rods,
   wherein each of the plurality of heating rods comprises:
   a first thermal diffusion plate;
   a ceramic substrate disposed on the first thermal diffusion plate and having a heating element arranged therein; and
   a second thermal diffusion plate arranged on the ceramic substrate,
   wherein the first thermal diffusion plate and the second thermal diffusion plate are stacked in a plurality of layers respectively,
   wherein the plurality of layers include a first layer and a second layer disposed on the first layer,
   wherein an interface is provided between the first layer and the second layer, and
   wherein the first layer has an inner porosity greater than a porosity of the interface between the first layer and the second layer.

10. The heating module of claim 9, wherein the plurality of radiation fins are porous.

11. The heating module of claim 9, wherein the radiation fins have a porosity of 10 pores per inch (ppi) to 100 pores per inch (ppi).

12. The heating module of claim 9, wherein the plurality of heating rods comprise at least one of $Si_3N_4$, $Al_2O_3$ and $ZrO_2$.

13. The heating module of claim 9, wherein the porosity of the interface between the first layer and the second layer comprises particles including a material of the second layer.

14. The heating module of claim 9, wherein the first layer comprises copper (Cu), and
   wherein the second layer comprises one or more selected from the group consisting of molybdenum (Mo), silver (Ag), titanium (Ti), and aluminum (Al).

15. The heating module of claim 14, wherein the first layer and the second layer are alternately arranged.

16. The heating module of claim 9, wherein the first layer and the second layer have thicknesses of 1 μm to 300 μm respectively.

17. The heating module of claim 9, wherein the first layer and the second layer are formed through screen printing.

18. A heater comprising:
   a case;
   a heating module arranged in the case; and
   a power module electrically connected to the heating module,
   wherein the heating module comprises:
   a plurality of heating rods; and
   a plurality of radiation fins arranged between two adjacent heating rods,
   wherein the heating module further comprises a support portion between the plurality of radiation fins,
   wherein one or more support portions identical to the support portion are arranged between the adjacent heating rods,
   wherein each of the plurality of heating rods comprises:
   a first thermal diffusion plate;
   a ceramic substrate disposed on the first thermal diffusion plate and having a heating element arranged therein; and
   a second thermal diffusion plate arranged on the ceramic substrate,
   wherein the first thermal diffusion plate and the second thermal diffusion plate are stacked in a plurality of layers respectively,
   wherein the plurality of layers include a first layer and a second layer disposed on the first layer,
   wherein an interface is provided between the first layer and the second layer, and wherein the first layer has an inner porosity greater than a porosity of the interface between the first layer and the second layer.

19. The heater of claim 18, wherein the plurality of radiation fins are porous, and
wherein porosities of the radiation fins range from 10 to 100 pores per inch (ppi).

20. The heater of claim 18, wherein the porosity of the interface between the first layer and the second layer comprises particles including a material of the second layer.

* * * * *